(12) United States Patent
Bintoro et al.

(10) Patent No.: US 7,474,180 B2
(45) Date of Patent: Jan. 6, 2009

(54) SINGLE SUBSTRATE ELECTROMAGNETIC ACTUATOR

(75) Inventors: Jemmy Sutanto Bintoro, Atlanta, GA (US); Peter J. Hesketh, Atlanta, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 116 days.

(21) Appl. No.: 10/699,210

(22) Filed: Oct. 31, 2003

(65) Prior Publication Data

US 2005/0116798 A1    Jun. 2, 2005

Related U.S. Application Data

(60) Provisional application No. 60/422,913, filed on Nov. 1, 2002.

(51) Int. Cl.
 *H01H 51/22* (2006.01)
(52) U.S. Cl. .......................................... 335/78; 200/181
(58) Field of Classification Search ...............................
   251/129.01–129.19; 355/78; 200/181, 200/512
 See application file for complete search history.

(56) References Cited

U.S. PATENT DOCUMENTS

| | | | |
|---|---|---|---|
| 4,824,073 A | | 4/1989 | Zdeblick |
| 4,966,646 A | | 10/1990 | Zdeblick |
| 5,029,805 A | * | 7/1991 | Albarda et al. ................ 251/11 |
| 5,058,957 A | | 10/1991 | Fell |
| 5,333,381 A | | 8/1994 | Gelardi et al. |
| 5,475,353 A | * | 12/1995 | Roshen et al. ................ 335/78 |
| 5,647,574 A | * | 7/1997 | Mettner et al. ......... 251/129.06 |
| 5,705,070 A | * | 1/1998 | Saaski et al. ................ 210/446 |
| 5,921,382 A | * | 7/1999 | Retter ......................... 200/514 |
| 6,123,316 A | * | 9/2000 | Biegelsen et al. ...... 251/129.01 |
| 6,328,279 B1 | | 12/2001 | Adkins et al. |

(Continued)

OTHER PUBLICATIONS

S. Bohm et al., A micromachined silicon valve driven by a miniature bi-stable electro-magnetic actuator, Sensors and Actuators 80 (2000) 77-83.

(Continued)

*Primary Examiner*—Elvin Enad
*Assistant Examiner*—Bernard Rojas
(74) *Attorney, Agent, or Firm*—Trenton A. Ward, Esq.; Ryan A. Schneider, Esq.; Troutman Sanders LLP

(57) ABSTRACT

A microvalve which utilizes a low temperature (<300° C.) fabrication process on a single substrate. The valve uses buckling and an electromagnetic actuator to provide a relatively large closing force and lower power consumption. A buckling technique of the membrane is used to provide two stable positions for the membrane, and to reduce the power consumption and the overall size of the microvalve. The use of a permanent magnet is an alternative to the buckled membrane, or it can be used in combination with the buckled membrane, or two sets of micro-coils can be used in order to open and close the valve, providing the capability for the valve to operate under normally opened or normally closed conditions. Magnetic analysis using ANSYS 5.7 shows that the addition of Orthonol between the coils increases the electromagnetic force by more than 1.5 times. At a flow rate of 1 mL/m, the pressure drop is <100 Pa. The maximum pressure tested was 57 kPa and the time to open or close the valve in air is under 100 ms. This results in an estimated power consumption of 0.1 mW.

18 Claims, 39 Drawing Sheets

U.S. PATENT DOCUMENTS

| | | | |
|---|---|---|---|
| 6,884,950 B1 * | 4/2005 | Nicholson et al. | 200/181 |
| 2001/0019034 A1 | 9/2001 | Tai et al. | |
| 2002/0054835 A1 | 5/2002 | Robotti et al. | |
| 2002/0100888 A1 | 8/2002 | Sharma et al. | |
| 2002/0139947 A1 | 10/2002 | Wang | |
| 2003/0019528 A1 | 1/2003 | Cotte et al. | |
| 2003/0155539 A1 | 8/2003 | Gringgen | |
| 2003/0172975 A1 | 9/2003 | Gilbert et al. | |
| 2006/0044088 A1 * | 3/2006 | Vaitkus et al. | 335/78 |

OTHER PUBLICATIONS

Yasuhiko Shinozawa et al., A Proportional Microvalve Using a Bi-Stable Magnetic Actuator, Jan. 1997.

Mircea Capanu et al., Design, Fabrication, and Testing of a Bistable Electromagnetically Actuated Microvalve, Journal of Microelectromechanical Systems, vol. 9, No. 2, Jun. 2000.

A. Meckes et al., Microfluidic system for the integration and cyclic operation of gas sensors, Sensors and Actuators 76 (1999) 478-483.

Hyoung J. Cho et al., A Bidirectional Magnetic Microactuator Using Electroplated Permanent Magnet Arrays, Journal of Microelectromechanical Systems, vol. 11, No. 1, Feb. 2002.

T. Lisec et al., Thermally Driven Microvalve with Buckling Behavior for Pneumatic Applications, Sensors and Materials, vol. 8, No. 5 (1996).

Edwin T. Carlen et al., Surface Micromachined Paraffin-Actuated Microvalve, Journal of Microelectromechanical Systems, vol. 11, No. 5, Oct. 2002.

I. Chakraborty et al., MEMS micro-valve for space applications, Sensors and Actuators 83 (2000) 188-193.

David S. Roberts et al., A Piezoelectric Microvalve for Compact High-Frequency, High-Differential Pressure Hydraulic Micropumping Systems, Journal of Microelectromechanical Systems, vol. 12, No. 1, Feb. 2003.

Ph. Dubois et al., Electrostatically Actuated Gas Microvalve based on a Ta-Si-N Membrane, Jan. 2001.

M. Kohl et al., Development of stress-optimised shape memory microvalves, Sensors and Actuators 72 (1999) 243-250.

J. Haji-Babaei et al., Integrable Active Microvalve with Surface Micromachined Curled-Up Actuator, Jun. 1997.

Nelsimar Vandelli et al., Development of a MEMS Microvalve Array for Fluid Flow Control, Journal of Microelectromechanical Systems, vol. 7, No. 4, Dec. 1998.

Levent Yobas et al., A Novel Bulk-Micromachined Electrostatic Microvalve with a Curved-Compliant Structure Applicable for a Pneumatic Tactile Display, Jun. 2001.

Charles Grosjean et al., A Practical Thermopneumatic Valve, Jan. 1999.

W.K. Schomburg et al., Design optimization of bistable microdiaphragm valves, Sensors and Actuators A 64 (1998) 259-264.

Collin A. Rich et al., A High-Flow Thermopneumatic Microvalve With Improved Efficiency and Integrated State Sensing, Journal of Microelectromechanical Systems, vol. 12, No. 2, Apr. 2003.

S. Messner et al., A Normally-Closed, Bimetallically Actuated 3-Way Microvalve for Pneumatic Applications, Jan. 1998.

Antonio Baldi et al., A Hydrogel-Actuated Smart Microvalve with a Porous Diffusion Barrier Back-Plate for Active Flow Control, Jan. 2002.

Robin H. Liu et al., Fabrication and Characterization of Hydrogel-Based Microvalves, Journal of Microelectromechanical Systems, vol. 11, No. 1, Feb. 2002.

* cited by examiner

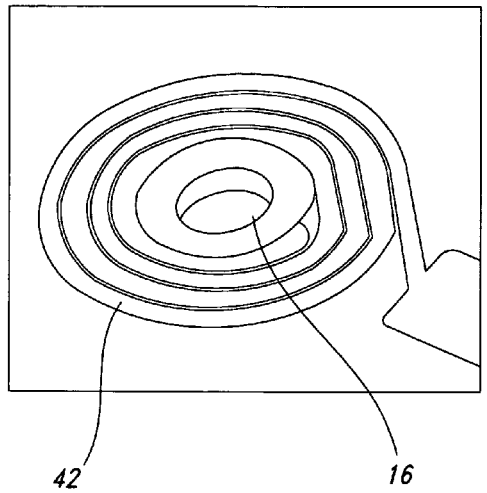
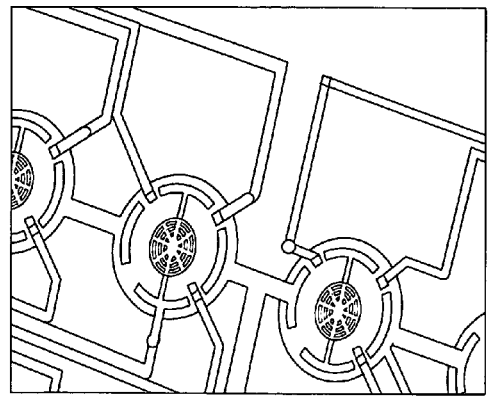
42  16
FIG. 20    FIG. 21
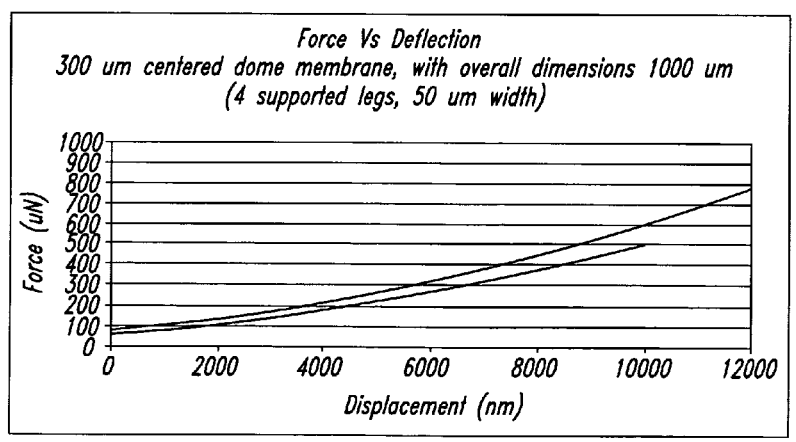
FIG. 22

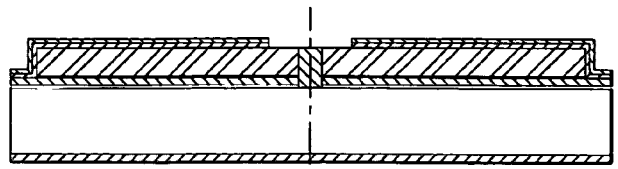
FIG. 38A
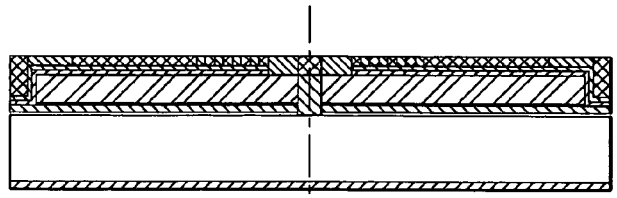
FIG. 38B
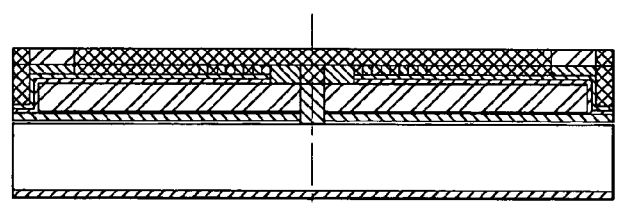
FIG. 38C
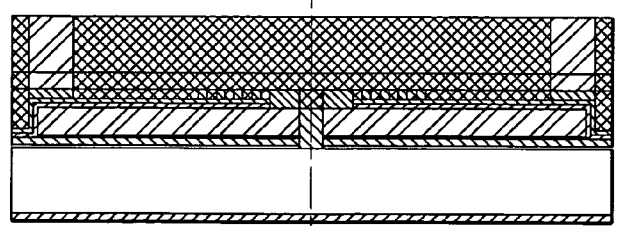
FIG. 38D
Legend:
 NiFe  PR, AZ 4620
 SiO$_2$  Permanent Magnet
 Cu

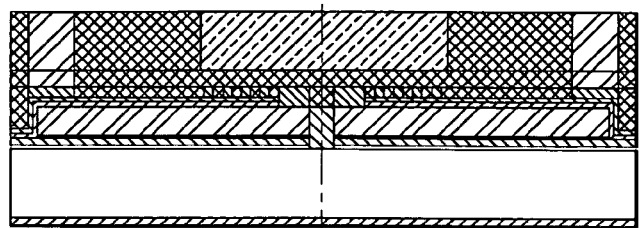
FIG. 38E
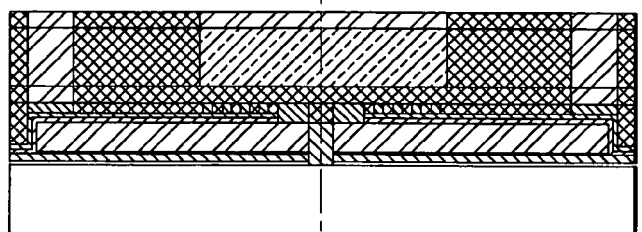
FIG. 38F
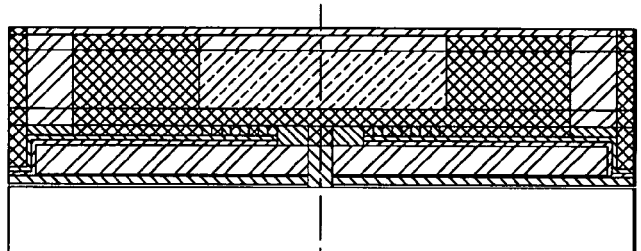
FIG. 38G
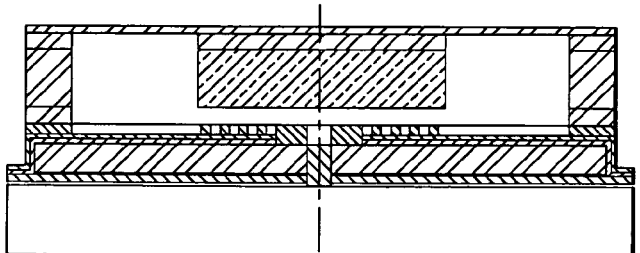
FIG. 38H
Legend:
 NiFe         PR, AZ 4620
 SiO$_2$      Permanent Magnet
 Cu

SINGLE SUBSTRATE ELECTROMAGNETIC ACTUATOR

BENEFIT CLAIMS TO PRIOR APPLICATIONS

This application claims the benefit of U.S. Provisional Application No. 60/422,913, filed 1 Nov. 2002.

GOVERMENT INTERESTS

The present invention was made with government support by the US Air Force under Contract #F33615-01-1-2173, awarded by the Department of Defense (DARPA). The Government has certain rights in this invention.

FIELD OF THE INVENTION

The present invention is related to a single substrate actuator, and the fabrication of same. In particular, the present invention is related to a microfabricated magnetically actuated latching microvalve.

BACKGROUND OF THE INVENTION

MEMS technology has become increasing popular in the past decade. Many inventions for the manufacturing of high technology products have been made based upon the miniaturization using the MEMS technology.

The microvalve is an important component in various fluidic applications, such as miniaturized chemical analysis systems, micro-pumps, and various precision fluidic dispensing spacecraft applications. MEMS technology has given an opportunity for microvalves to be package onto a fluidic board with integrated fluidic channels to interconnect all the parts. This is similar to a printed circuit board in electronics [1].

Microfluidic applications are widespread, and include applications were the fluid is metered or dispensed in a controlled manner, and applications in which the fluid is used as a medium to transport objects or molecules. If the valve channels are wide enough to allow a finely divided powder to pass through without clogging, then the dispensing of a large number of materials is possible. Fluids in the food industry during manufacturing or at point of use mixing of liquids or powders. Precision dispensing of fluids or powders for manufacturing processes are important to conserve material costs, and to provide accurate mixing of component parts either in the gas phase, for example, in semiconductor processing by chemical vapor deposition, or in the liquid phase for liquid phase growth of films, and for definition of the location of the fluid/gel such as in sealing of component or gasket formation or in the assembly of components from liquid precursors. Cosmetics dispensing can make use of valves for dispensing cleaning solvents, and for painting of surfaces. Other uses include the control of fuel injection in an engine, or a propulsion system for aerospace applications of rocket propulsion systems. Biomedical applications include the controlled release of drugs or liposomes of capsules containing drugs.

There are applications where the fluid is used to move something around a system, commonly know as microfluidics, in which either existing well-know chemical or bioanalysis techniques are scaled down in volume to provide faster, higher throughput analysis on small sample volumes, or new methods of analysis that rely on the combinations of chemicals/biochemicals that can be compared in a highly parallel assay, such as biopanning or combinatorial chemistry.

Other examples include sample injection in a gas chromatographic system, high pressure liquid chromatography, field flow fractionation, protein analysis by affinity chromatography, DNA analysis by hybridization, or an immunoassay on a chip. These can be used for numerous applications in medical diagnostics and patient treatment by providing timely bed-side monitoring, or in applications where rapid screening against drug allergic reactions are required. Understandably, bio-detection of toxins and other hazardous agents is a topic where portable, light weight, automated analysis systems will have widespread use. This includes both civilian and military use. Such applications range from checking food and the shipping of packages that are entering the US, to "sniffing" for agents in a high risk environment, to monitoring a nation's water supply.

Valves can further be used to transfer power in miniature hydraulic system, or in the controlled lubrication of surfaces where surface tension driven forces are influenced by the precision dispensing of a fluid is important.

A major advantage of valve miniaturization is that diffusion processes such as mixing and heating, which are typically required in miniature chemical analyses, equilibrate much faster thereby, drastically decreasing assay times. Another benefit of downscaling is that the use of expensive chemical reagents can be reduced, and that sample volumes on the order of only a few μliters [1, 2] are required for an analysis. To achieve these benefits, the dead volume in all fluidic components should be minimized. This can be achieved by MEMS technology and involve the implementation of microvalves that can be integrated with the fluidics [3]. For a microvalve, the minimization of dead volume can be achieved by adopting silicon micro-machining techniques such as KOH etching [4, 5] or deep reactive ion etching [6]. Moreover, the silicon micro-machining has provided an excellent feasibility to integrate other system components such as micro-filters and sensors within the valves [7].

Microvalve development is closely linked with the research in MEMS actuators. The microvalve is involved in many applications, each requiring different characteristics. Even though millions of dollars have been spent in the research, there has not yet been commercialization of the MEMS microvalve, quite unlike the silicon pressure sensor that has been largely commercialized in many engineering applications, including automobile, fluidic device, and jet propulsion.

The fact is that the MEMS valves developed in the research lab are simply not yet reliable and robust enough for commercial application [8, 9, 10]. The current state of research in the microvalve field is not well established, nor oriented into a particular application. The research is mainly focused in the state of innovation, where proper application of the valve is not the focus area. This is a main reason why the MEMS valve has failed to come to the market.

Another challenge in bringing MEMS device to market is the need for CMOS compatibility. Currently, it is a big demand for the MEMS actuator to be CMOS compatible so that it can be integrated in the fabrication with other electrical circuit(s). This has made MEMS fabrication more difficult, as its maximum fabrication temperature should be less than 400° C.

Miniaturization itself is yet another hurdle in the microvalve art. Unlike pressure sensors that require only a silicon membrane as the main component, the microvalve essentially comprises three main parts: an actuator, a cantilever/membrane, and fluidic connections [10, 11, 12, 13], all of which increase the complexity of the design and fabrication of the microvalve. Current sizes of the MEMS microvalve are relatively large in size, that is, larger than 1 mm² [1, 2, 6, 8, 14-16].

Research in microvalves is widely developed in the Untied States and in Europe. The conventional microvalve can include a valve seat, a membrane/diaphragm, and an actuator. The developments of valve seat and membrane are typically similar and do not show significant differences. Different types of actuators are known, for example: magnetic [1-5], thermal [6-7], piezoelectric [8-9], electrostatic [10-14], pneumatic [15-18], and Hydrogel [19-20]. Each type of actuators has it own characteristics, advantages, and disadvantages. Electrostatic and piezoelectric actuators generally generate small membrane deflection (<5 μm) [10, 13], while pneumatic, magnetic, thermal, and Hydrogel actuators produces larger deflection (>5 μm) [20].

Each actuation type is briefly reviewed and discussed, including its working principal, advantages, and disadvantages.

Electromagnetic Actuation

This type of microvalve utilizes the force generated from magnetic actuation, which can be from "coil to coil" or "magnet to coil" [4, 5] or the combination of both [3]. The design can be quite complex. Yasuhiko Shinozawa [2] has developed a valve that is fabricated with a combination of a micromachined coil and a permanent magnet. The overall valve dimensions including the actuator are about 5×5×5 mm³. The valve has a vertical displacement of 0.5 mm, which alleviates known clogging problems.

By implementing the permanent magnet, the valve has developed two stable conditions. Its smallest controllable amount of fluid (water) was 0.7 μl/min. S. Bohm [1] designed a microvalve including two separated parts that were fabricated in two-separated processes. The silicon-valve part, with an overall dimension of 7×7×1 mm³ was made by a sandwich construction of two etched silicon wafers with KOH Etching.

Thermal Actuation

This type of microvalve utilizes the elastic deflection technique caused by heating the membrane. The valve design is simpler than the electromagnetic actuator, as it only requires thermal energy to heat up and deflect the membrane. T. Lisec [6] developed a designed for high crushing pressures of approximately 1 bar, delivering flow rates of 700 ml/min=11, 667 μl/s. The switching time of this device is about 15 ms, which is extremely low for thermal actuation.

The thermal principle was chosen because it gave both high forces and large deflections in a simple valve construction. The continuous power consumption was in the range of 1-4 Watts. Carlen [7] developed a slightly different design for the valve, using a paraffin micro-actuator as the active element. The entire structure had a nominal dimension of diameter 600 μm×30 μm was batch-fabricated by surface machining. For gas flow rates, the actuation power ranged from 50 to 150 mW with the leak rate of 500 μsccm.

Piezoelectric Actuation

This type of microvalve utilizes the piezoelectric behavior of the material due to the generated electric field at an applied voltage. For this type of design, the membrane actuator can be made directly from a piezoelectric material, or can be attached by layers of piezoelectric material. The piezoelectric force is typically small, since the membrane's structural design is very important in order to produce large displacement—otherwise clogging may occur.

I. Chakraborty [8] designed a valve to meet the rigorous requirements for space applications, such as micro-propulsion, in situ chemical analysis of other planets, or microbiology. It required a small, yet reliable, silicon valve with extremely low leak rates and long shelf lives. Further, it must survive the perils of space travel, which include unstoppable radiation, monumental shock and vibration forces, as well as extreme variations in temperature.

Roberts [9] developed a piezoelectric microvalve for high frequency (>1 kHz) and high pressure applications (>300 kPa). His design has provided large stroke (20-30 μm) and a low closing time (<1 ms).

Electrostatic Actuation

The electrostatic valve utilizes the electrostatic force generated between two surfaces. The amount of force generated depends upon the gap-distance between the surfaces. The electrostatic force is generally small. A small distance between two surfaces is required in order to provide an adequate amount of force for some fluctuation/displacement. However, one has to be very careful because a small displacement may limit the microvalve performance due to clogging.

Ph. Dubois [4] developed a valve that includes a vertically moving, double-clamped Ta—Si—N membrane, located over a small (10 μm) round orifice, machined by deep reactive ion etching through the silicon substrate. In most applications, Ta—Si—N has been used only as diffusion barrier. Nevertheless, this material has numerous characteristics that can be used in MEMS applications.

Vandelli [13] developed a MEMS microvalve array for fluid flow control that use electrostatic actuation, which was used to control air-flow rates of 150 ml/min for a pressure differential of 10 kPa.

Thermo Pneumatic Actuation

This type of valve utilizes the actuation generated from the thermo-pneumatic force, which comes from an increase of gas pressure due to thermal expansion. This type of actuator requires a lot of power consumption and has a long response in valve closing/opening. However, the membrane deflection is generally large to avoid clogging.

W. K Schomburg [6] developed a thermo pneumatic actuated valve with a composite membrane of silicon rubber and Parylene. The design requirements for the valve membrane include they be small in size, they be impermeable to the working fluid, have a large deflection, and have an adhesive compatible surface for bonding the seat chip.

Parylene C forms an effective vapor barrier, while silicon rubber is very soft and elastic. The Young Modulus of the MRTV1 Silicon rubber is 0.51 MPa and of Parylene C is 4.5 GPa. A composite membrane from these two materials has nice flexibility and impermeability properties. In order to keep the membrane soft, a very thin Parylene layer was used compared to the silicon rubber layer.

Rich [17] developed a more complex thermo pneumatic microvalve, which has a sealed cavity below the diaphragm containing a volatile fluid, the pressure of which can be increased by resistive heating to deflect the diaphragm, thus closing the valve. One of these valves suggest a 2000 torr pressure rise with 50 mW input and a is response time.

Hydrogel Actuation

Lastly, the actuation of the Hydrogel microvalve responds to the changes in the concentration of a specific chemical species in an external liquid environment [19]. Baldi [19] made a valve that incorporated a Hydrogel disc sandwiched between a porous plate and a flexible silicone rubber membrane. The swelling of the Hydrogel that is produced by diffusion of the chemical species through the porous plate results in the deflection of the membrane and closure of the valve intake orifice. Baldi's valve was based on a phenylboronic acid Hydrogel and used to construct a valve that response to the changes in the glucose concentration and pH. However the response time is very slow, with the fastest achieved being 16 minutes using a 70 um thick Hydrogel and a 60 um porous back plate.

Robin H. Liu [20] made a valve based on Hydrogel actuation, which has the closing and opening times on the order of 10 s, and claims to be operable at the differential pressure as large as 50 psi.

Based on this review on different type of actuators for microvalves, Table 1 illustrates a brief summary of the advantages and disadvantages of each actuator.

TABLE 1

| Type of Actuation | Advantages | Disadvantages |
|---|---|---|
| Thermal | The amount of deflection can be adjusted from the amount of power input to the heating element. | Power consumption can be large and not applicable for application where the energy consumption is limited |
| | It is simple, basically the elongation of material due to the thermal expansion give the actuation to the membrane [6, 7] | The thermal expansion may cause loosening to the support, which may introduce some leakage in an improper design |
| | It can be integrated with shape memory material at limited number of cycles in order to give pre-stress on the membrane for increasing closing force. [11] | The valve closing time may not be the same as the opening time |
| | Using the optimization of the flow back-pressure in closing the valve reduces the leaking possibility and improved the device crushing pressure [6] | The heating to fluid may not be applicable to some MEMS application. For fluid with low evaporation temperature, may evaporate during the valve operation. |
| Piezoelectric | Flexible, the amount of membrane deflection can be adjusted from the amount of potential voltage applied to the piezoelectric material [8] | It requires high power consumption. Recent piezoelectric valves require continuous power to keep the valve in the open/close position. |
| | It is pretty stable in the environmental condition that involves high thermal fluctuation, shock, and vibration. It may produce a reliable microvalve suitable for heavy-duty application [9] | It generally produces a small amount of deflection at a given amount of voltage. |
| | Typical piezoelectric disk requires high voltage to produce substantial deflection, the laminated piezo stacks may mitigate this concern to produce larger displacement [8] | The structure and fabrication processes may be complex, it requires enormous amount of time in to produce a reliable fabrication. |
| Electrostatic | It is simple in the structural system; the required components are not complex. | The force is typically small. The greater the voltage, the greater the force is, with the limit of break down voltage |
| | The response time to close and opening the valve is generally very small (~ms) if the distance between two surfaces is small (<1 µm). [10, 13] | The actuation distance is typically small (<5 µm). Small distance between the membrane and insulation layer increases the clogging possibility. |
| | Force generated when the membrane touches the insulation layer is extremely large; this produces a high sealing force for a normally open valve. | The actuator dimensions are typically large to produce large deflection, this contradict to the MEMS application, where a small device is required. |
| Thermo pneumatic | Flexible, the amount of deflection can be adjusted based upon the amount of power given to the heating element. This gives the utilization for a variable valve. | The response time is very long for both opening and closing the valve. This valve is not suitable for high frequency cycle operation. |
| | Large displacement can be developed in a small valve package [16, 17] | Heating to the fluid may not be applicable to some application, particularly if the working fluid has low evaporation temperature |
| | The implementation of the bistable principle is feasible and indicates a significant reduction in the power consumption [16]. | The vapor pressure change in the fluid inside the chamber due to overheating caused by the heater may cause permanent damage to the membrane. |
| Magnetic | It is highly integrated with the actuation technique, such as pre-buckled membrane for bi-stable conditions [22] which reduces the amount of power consumption. | The design may be complex, particularly for the membrane that involves bi-stable positions. |
| | It is flexible; the amount of actuation force depends on the amount of current applied to the coil. [3, 4] | The permanent magnet is usually demagnetized over the application life. |
| | The time required to open and close is similar; it is useful for the application where reliable and exact time is required. | The magnet saturation of the structure limits the maximum amount of force produced by the coils. |
| | The combination between a permanent magnet and coils may increase the crushing pressure of valve [3, 4, 5]. This is useful for the high duty valve, which expose in closing high-pressured fluid. | |

TABLE 1-continued

| Type of Actuation | Advantages | Disadvantages |
| --- | --- | --- |
| Hydrogel | There is little power consumption required and suitable for application such as drug delivery or other chemicals on demand [19, 20]<br>Environmentally sensitive Hydrogel offer unique opportunities for active flow control in micro-flow systems [19]<br>The actuation dimension is extremely large can more than 100 μm [19] | The volume change of the Hydrogel is diffusion-limited and exceedingly slow when the path length is large<br>Since it relies on the change in environmental condition, this valve is not widely applicable for all applications<br>As it is sensitive to the environmental condition.<br>The opening/closing time may not be consistent through the operation life |

Fluidic connections for the microvalve also present a challenge in the design. In order to simplify the fabrication, most microvalves are fabricated with two or three wafers bonded together, simply to build the inlet and outlet hole [3,4,9,14,17,19-20]. Even though the wafer bonding processes are simple, they are not desirable because it closes the opportunity for the microvalve hybrid integration with the electrical circuit on a single wafer. The yield rate of the wafer bonding is generally low and reduces the fabrication efficiency. Fabricating microvalve from two or three wafers going into a different bath process and finally assemble together, requires a good bonding technique that generally is done at high temperature (above 400° C.), and is clearly not CMOS compatible.

To fabricate a complete set of microvalves fully by surface micro-machining is not easy. The current microvalve art has not yet fully fabricated the whole structure of the valve by MEMS surface micro-machining technique. Some valves were produced by combining parts, which parts are manufactured by conventional machining tool [1-3, 5, 8, 20]. Yet these attempts are not suitable with the spirit of MEMS as a batch fabrication. Thus, this kind of microvalve design will find itself difficult for commercialization in wide industrial area.

In view of the foregoing, it is apparent that it would be beneficial to provide a microvalve fabrication system incorporating the microvalve on a single substrate, preferably a magnetic microvalve. It is to the provision of such a system that the present invention is primarily directed.

REFERENCES

[1] S. Bohm, G. J Burger, M. T. Korthorst, F. Roseboom, *A micromachined silicon valve driven by a miniature bi-stable electro-magnetic actuator*, Sensors and Actuators A 80, 1990, pp. 77-83

[2] Yasuhiko Shinozawa, Takeshi Abe, and Takehiko Kondo, *A Proportional Microvalve Using A Bi Stable Magnetic Actuator*, MEMS, IEEE proceedings, 1997, pp. 233-237

[3] M. Capanu, J. G. Boyd IV, and P. J. Hesketh, *Design, Fabrication, and Testing of a Bistable Electromagnetically Actuated Microvalve*, Journal of Microelectromechanical Systems, IEEE, June 2000, Vol. 9, No. 2, pp. 181-189

[4] A. Meckes, J. Behrens, and W. Benecke, *Electromagnetically Driven Microvalve Fabricated in Silicon*, International Conference on Solid-State Sensors and actuators, Transducers, June 1997, pp. 821-824

[5] H. J. Cho and C. H. Ahn, *A Bidirectional Magnetic Microactuator Using Electroplated Permanent Magnet Array*, Journal of Microelectromechanical Systems, IEEE, February 2002, Vol. 11, No. 1, pp. 78-84

[6] T. Lisec, S. Horschelmann, H. J. Quenzer, B. Wagner, W. Benecke, *Thermally Driven Microvalve with Buckling Behavior for Pneumatic Applications*, IEEE, 1994, pp. 13-17

[7] E. T. Carlen and C. H. Mastrangelo, *Surface Micromachined Paraffin-Actuated Microvalve*, Journal of Microelectromechanical Systems, IEEE, October 2002, Vol. 11, No. 5, pp. 408-420

[8] I. Chakraborty, W. C Tang, D. P. Bame, T. K Tang, *MEMS micro-valve for space applications*, Sensors and Actuators A 83, 2000, pp. 188-193

[9] D. C. Roberts, H. Li, J. L. Steyn, O. Taglioglu, S. M. Spearing, M. A. Schmidt, and N. W. Hagood, *A Piezoelectric Microvalve for Compact High-Frequency, High-Differential Pressure Hydraulic Micropumping Systems*, Journal of Microelectromechanical Systems, IEEE, February 2003, Vol. 12, No. 1, pp. 81-92.

[10] Ph. Dubois, B. Guldimann, M. A. Gretillat, N. F. de Rooi, *Electrostatically Actuated Gas Microvalve Based On A Ta—Si—N Membrane*, MEMS, 14$^{th}$ IEEE International Conference, 2001, pp. 535-538

[11] M. Kohl, K. D. Skrobanek, S. Miyazaki, *Development of Stress-Optimized Shape Memory Microvalve*, Sensors and Actuators A72, 1999, pp. 243-250

[12] J. Haji-Babaei, C. Y. Kwok, and R. S. Huang, *Intergradable Active Microvalve with Surface Micromachined Curled-up Actuator*, International Conference on Solid-State Sensors and actuators, Transducers, June 1997, pp. 833-836

[13] N. Vandelli, D. Wroblewski, M. Velonis, and T. Bifano, *Development of a MEMS Microvalve Array for Fluid Flow Control*, Journal of Microelectromechanical Systems, IEEE, December 1998, Vol. 7, No. 4, pp. 395-403

[14] L. Yobas, M. A. Huff, F. J. Lisy, and D. M. Durand, *A Novel Bulk-Micromachined Electrostatic Microvalve with a Curved-Complaint structure Applicable for a Pneumatic Tactile Display*, Journal of Microelectromechanical Systems, IEEE, June 2001, Vol. 10, No. 2, pp. 187-196

[15] Charles Grosjean, Xing Yang, and Yu-Chong Tai, *A Practical Thermo Pneumatic Valve*, IEEE, 1999, pp. 147-152

[16] W. K Schomburg and C. Goll, *Design Optimization of Bistable Micro Diaphragm Valves*, Sensors and Actuators A 64, 1998, pp. 259-264.

[17] C. A. Rich and K. D. Wise, *A High-Flow Thermopneumatic Microvalve with Improved Efficiency and Integrated State Sensing*, Journal of Microelectromechanical Systems, IEEE, April 2003, Vol. 12, No. 2, pp. 201-208

[18] S. Messner, M. Muller, V. Burger, J. Schaible, H. Sandmaier, and R. Zengerle, *A Normally-Closed, Bimetallically Actuated 3-Way Microvalve for Pneumatic Applications*, IEEE conference, 1998, pp. 40-44

[19] A. Baldi, Y. Gu, P. E. Loftness, R. A. Siegel, and B. Ziaie, *A Hydrogel-Actuated Smart Microvalve with a Porous Diffusion Barrier Back Plate for Active Flow Control*, IEEE conference, 2002, pp. 105-108

[20] R. H. Liu, Q. Yu, and D. J. Beebe, *Fabrication and Characterization of Hydrogel-Based Microvalves*, Journal of Microelectromechanical Systems, IEEE, February 2002, Vol. 11, No. 1, pp. 45-53

[21] C. W. Moore and P. A. Kohl, *Direct Methanol Fuel-Cell*, Proceeding of Electrochem Soc, Philadelphia meeting, 2002, MEMS Vol. 2002-6 pp. 183-189

[22] J. S. Bintoro, P. J. Hesketh, *Design of An Electromagnetic Actuated Microvalve with Bistable Conditions*, Proceeding of Electrochem Soc, Philadelphia meeting, 2002, MEMS Vol. 2002-6, pp. 98-104

[23] J. S. Bintoro and P. J. Hesketh, *Fabrication of a Bistable Electromagnetic Actuator for Microvalve*, Proceeding of Electrochem Soc, Paris Meeting, 2003, MEMS

[24] J. S. Bintoro and P. J. Hesketh, *A Bistable Electromagnetic Actuated Microvalve with Integrated Switching Mechanism*, ICEME2003-42892, Electric and Magnetic Phenomena in Micro/Nano-Scale Systems, ASME, November 2003

[25] J. S. Bintoro, R. Luharuka, and P. J. Hesketh, *A Complete Structure of a Bistable Electromagnetic Actuated Microvalve Fabricated on a Single Wafer, implementing the SLA Technique and PDMS Structure*, ICEME2003-43857, MEMS, Microfluidic Devices and Systems, ASME, November 2003.

SUMMARY OF THE INVENTION

Briefly described, in a preferred form, the present invention is an actuating system comprising a non-electrostatic, non-thermal actuator with channels, fabricated on a single substrate. Namely, the present invention is a magnetic valve fabricated on a single substrate. The valve is preferably a latching miniature electromechanical valve, designed such that it can be used with fuel cell systems. Other applications of the present invention include utilizing two or more microvalves to form a pumping system.

The present actuator is locatable in a flow path, and comprises a single substrate upon which is fabricated a membrane and a membrane activating mechanism. The membrane is capable of moving though a first position and a second position, in the first position, the membrane inhibits flow through the flow path, and in the second position, the membrane enables flow through the flow path. The membrane activating mechanism moves the membrane between the first position and the second position. The membrane can be held above the substrate by posts.

Preferably, the present actuator is an electromagnetic actuator, as distinguishable from both the electrostatic type, which utilizes the electrostatic force generated between two surfaces, and the thermal type, which utilizes the elastic deflection technique caused by heating the membrane.

The membrane of the present actuator can be a pre-stressed membrane, and the membrane activating mechanism can includes an electromagnetic force generator. In this embodiment, the membrane is positionable into the first position by the pre-stressed nature of the membrane. When the electromagnetic force generator generates an electromagnetic force in a first direction, the membrane is drawn into the second position. Then, when the electromagnetic force generator generates an electromagnetic force in a direction substantially opposite the first direction, the membrane is drawn into the first position.

In another embodiment, the membrane can be a convex membrane.

The novelty of the pre-stressed membrane embodiment of the present invention is not limited to a single-substrate design. For example, it is believed novel for an actuator or more than one substrate to include a pre-stressed membrane, a convex membrane, a membrane having a dome portion and a membrane having a dome portion and legs.

The electromagnetic force generator can include a coil or coils through which a current is provided, to generate the force, and/or a magnet. Further, the stability of the present membrane to remain in the first and/or second position can be provided without an induced force through the coil(s), making the design a low power consuming design.

The coil can be located under the membrane, or can be in other locations as related to the membrane, but in such other locations, the actuator may not provide its beneficial qualities at such a low power as would the coil under the membrane. The coil(s) can further be located on, or integrally, with the membrane, wherein the membrane will move with the coils attached on it.

Further, the magnet embodiment of the present invention need not comprise a magnet integrated with the substrate, as the actuator can be positioned in a constant magnetic field generated by an external magnet in proximity to the actuator.

Preferably, the present actuator has an energy consumption of 400 mW or less to fully actuate, and fully actuates in less than or equal to 0.36 seconds.

Another embodiment of the actuator provides for four possible positions that can be achieved by using the combination of a pre stressed membrane with permanent magnets—providing two possible stable positions, and two latching positions.

Further, the actuator can be designed with a coil on the bottom, but having a "bidirectional movement" of the membrane with a permanent magnet attached on the membrane. The bidirectional movement is achieved by applying opposing current to coils.

The membrane can be a rotational membrane.

A modulating membrane reacting as an impinging nozzle by applying regulated current on bottom and top coils with a certain lagging time is extremely useful in the development of electronic cooling.

A high permeability material with a high magnetic field saturation, for example, Pemalloy or Orthonol can provided between at least one coil turn of the coil(s).

The dimensions of a preferred actuator include an outside diameter 1 mm, and a channel diameter of 50 microns. This leads to the fast response time because of the small overall mass of the membrane, about 20 micro-grams preferably.

The invention is an improvement over the conventional miniature actuator, comprising a new design of microvalve that is robust, CMOS compatible, fully fabricated by MEMS surface micro-machining on a single wafer process, low temperature operation, and inert/non-reactive to the working fluid in the valve environment. The present invention is well suited for the application in a micro-fluidic device for a fuel cell, namely a direct methanol fuel cell built on a single wafer.

Fabrication of the present latching miniature electromechanical valve has been developed on a single wafer. The fabrication process includes electroplating NiFe (or another/other suitable higher permeability alloy(s) or metal(s)), Cu and Au (or another/other suitable electrical conductor(s)), into a photoresist mould, and stacking the layers to make geometry.

The present actuating system comprises a microvalve, fuel cell channels, and a pressurized chamber. The microvalve includes a membrane/diaphragm, an actuator, and a valve flow channel. The diaphragm preferably has two stable positions. These two positions can be provided by, for example, a pre-stressed diaphragm structure, a convex shaped diaphragm, a permanent magnet, or an electroplated permanent magnet. In a preferred embodiment, a current of approximately 0.2-0.6 Amps, applied for approximately 0.5-10 ms, is sufficient to move the diaphragm between the two stable locations.

The actuator can be a coil. A coil is integrated under the diaphragm to maximize the displacement force. The membrane support has a spring constant that is design to match the magnetic forces. A permanent magnet is placed under the wafer to provide a latching force for the valve's closed position, which is set in magnitude so that the current can be turned off on the coil. More than one coil, for example two coils, can be combined, a top and bottom coil on either side of the membrane, enabling the valve to function as a modulated pump by applying a modulated current to both coils at a certain lagging time. A two or more coil embodiment can utilize a valve having two separate inlets and one outlet, forming a three-way valve.

The function of the valve is to turn on and off the fluid flow from the pressurized chamber, as well as to control the amount of fuel entering the fuel cell channel. Since the preferred application of the present microvalve is for a fuel cell, where electrical power is the product, power minimization is one of the critical issues in the design. The valve thus has relatively low power consumption, meaning the valve can, for example, be used to regulate the fuel supply by repeatedly switching between an open and a closed position, with control of the duty cycle.

The fuel used in the fuel cell is typically a mixture of water and methanol, or formic acid, and the operation of the present device should not be reactive to the fuel, and be inert. Thus, the present invention preferably is designed to operate within a working temperature not to exceed the evaporation temperature of methanol, which is about 60° C.

The possibility of impurities in the fuel is another design issue for the valve. One of the critical problems in a microvalve is the "clogging" that may result from the presence of liquid impurities, with the hydraulic diameter <1 μm. In order to prevent this, the present microvalve has a preferably opening and closing displacement/stroke of more than 5 μm.

Further, the stroke of the membrane actuation should be more than 10 μm, in order to accommodate these impurities. Since the fuel flow rate typically is very small, for example less than 1 μl/min, in order to minimize the leaking rate, the valve should have a very good sealing force to the fluidic flow when it is closed.

Another embodiment of the present invention includes the design and fabrication of a bistable electromagnetic actuated microvalve. The completely magnetically closed structure is designed by using finite element method, ANSYS 5.7. The valve actuator of this embodiment comprises an electromagnetic coil, a support structure, and a membrane made from a dome that is supported by cantilever legs. The dome is preferably centered. The bistable embodiment of the present electromagnetic valve is achieved by implementing a permanent magnet attached either on the back of the wafer, or being electroplated on the bottom of the membrane, or prestressing the cantilever legs and/or dome, or by building the cantilever legs and/or dome in a convex shape.

The bistable electromagnetic actuated microvalve embodiment has the thicker dome region to reduce the onset of saturation of the magnetic field within the Permalloy (or Orthonol) dome. This allows a higher magnetic field intensity in the gap at large current levels in the coil, and hence results in a larger force generated during the valve opening and/or closing. This thus increases the working range of the valve, through stiffer springs, and/or higher working pressures, and/or higher diaphragm velocities—producing more rapid closure of the valve.

The present bistable electromagnetic actuated microvalve is specifically designed for fuel cell applications, and the modeling of the valve magnetic structure both in 2D and 3D by using finite element method of ANSYS 5.7 shows the significance of a closed loop magnetic structure, and the advantages of Orthonol or other high permeability metal orally insertion between the coils. The result is a higher magnetic flux in the gap for the same current, which increases the force on the actuator, and decreases the power consumption of the valve. The effect on the force generated is approximately a factor of a two times increase.

The present system further comprises a position confirmation system, to confirm the position of the valve diaphragm. In one embodiment, electrical connections are made to the dome and the valve gasket so that when the valve actuator is open, there is no contact; however, when it is closed, there is a contact between these two conductive surfaces. This results in an electrical circuit being made between the dome and the gasket of low resistance. This can be used to confirm the position of the valve diaphragm by an electrical measurement of resistance.

In an alternative embodiment of the position confirmation system, the inductance of the coil can be monitored during valve operation to determine the location of the diaphragm. When the diaphragm closes, reducing the air gap to a minimal valve, the magnetic field will increase and inductance and stored energy will increase. Using a small AC modulation of the drive current, the AC impedance can be determined with a bridge circuit, and utilized to determine the diaphragm location as a function of time. Thus, feedback control of the velocity of the membrane can be implemented by adjusting the drive current as a function of time. This can improve the dynamic operation of the valve, and in particular, lower the average current necessary to close the valve—further minimizing power consumption.

The electrical performance can be optimized by including noble metal or metal oxide contract pads, which are stable and corrosion resistant under repeated cycling. By using such, the function of an electrical relay can be realized. The latching nature of the actuator can then provide a latching electrical relay function. Further, the valve actuator can be optimized for use with alternating current, or at RF or microwave frequencies, which includes the provision of a waveguide on the substrate and on the diaphragm, providing matching and reduced electrical loses at high frequencies.

In an alternative embodiment, the current can be supplied to the coil with an RF induction so that no direct electrical wiring is necessary between the valve and control circuit. The coil thus acting secondarily as a transformer. The induced current generates an alternating magnetic flux that generates a net attractive force between the, for example, Permalloy membrane, and the valve seat. In such an embodiment, the permanent magnet could not be used to obtain a latching effect because the current in the coil is of an alternating direction.

Regarding the fabrication, the microvalves are fabricated on top of a single wafer that preferably uses eight masking steps. The fabrication processes can be entirely done by surface micro-machining and electroplating on a single wafer with a preferably maximum fabrication temperature of 300° C., providing the potential of a CMOS-compatible process.

For the inlet fluidic connection, a hole can be etched through the back of wafer after the entire valve structure has been built on the top of the wafer.

Experimental data on the membrane stiffness shows good agreement with the predicted ANSYS 5.7 analysis of the value—the magnetic force required to fully deflect the membrane at a distance of 12 μm. The membrane deflects rapidly, on the order of microseconds, or even less than a microsecond in air, when a drive frequency of approximately 100 Hz to 1 kHz is applied. This corresponds to an energy of approximately 1.2 mJ per actuation.

The valve packaging for fluidic testing was fabricated with stereolithography in an epoxy polymer resin. To define the fluid interconnection flow channels, a mould was made with the same process. Miniature tubes were inserted into the mold, and the mold was filled with PDMS to define the inlet and outlet fluidic channels for experimental tests, as well as to provide sealing to the valve.

The tests showed that the pressure drop across the valve with an inlet diameter of approximately 60 μm was on the order of approximately 600 Pa for a 1 μl/min fuel flow rate. This value is relatively negligible as compared to the expected 10 kPa pressure drop across the fuel cell channel. The addition of a Parylene coating to the microvalve structure with a thickness of approximately 0.5-1 μm improved the sealing performance of the valve and minimized leakage.

A preferred fabrication method comprises the following steps. After 0.5 μm PECVD $Si_3N_4$ on the back side of wafer, a DC sputtered film Ti/Cu seed layer is deposited. Spin coat PR AZ4620 and photolithography is used to create a mode for NiFe electroplating at a density of 30 mA/cm$^2$ by pulsed electroplating.

Electroplating 0.5 μm of Au to facilitate wire bonding is then provided, at a density of 1 mA/cm$^2$. A PECVD $SiO_2$ layer is then deposited on a top of the wafer to provide insulation, followed by a Ti/Cu seed layer.

Spin NR 1500 P and photolithography are provided for etching a contact window. NiFe electroplating of the whole wafer is then run, and then the negative photoresist is striped. Etching of the Cu seed layer and $SiO_2$ by $NH_4OH$/$CuSo_45H_2O$ (Saturated) and BOE, respectively, follows. Then, etching of the Ti seed layer, and then DC sputter Ti/Cu/Ti seed layer is provided.

Next, spin PR AZ 4620 for the Cu electroplating at a density of 5 mA/cm$^2$ by pulsed electroplating. Electroplate Au into the same mold for wire bonding.

Next, spin PR AZ 4620 and photolithography for the mold of valve structure formed by NiFe electroplating to a thickness of 12 μm, and then DC sputter Ti/Cu speed layer.

Next, spin PR AZ 4620 and photolithography for the membrane mold for NiFe electroplating to the thickness of 3 μm. Strip the all PR, seed layer, and finally attach the permanent magnet on the back of the wafer.

Lastly, provide ICP etching on the back of the wafer to create an inlet hole.

Accordingly, an object of the present invention is to provide a low power valve on a wafer with a thin film direct methanol fuel cell, and use the same substrate for a CMOS circuit.

Another object is to provide a self-contained valve microsystem, having a small dead volume in the valve—due to the small size of the system.

An object of the present invention is to further provide a low power consumption system—due to the latching behavior of the valve.

A further object of the invention is to provide a valve that is compatible with the CMOS fabrication processes, and allows integration.

Another object of the present invention includes providing a valve design that can be easily integrated into arrays, for fluid control, and also with control electronic circuits.

An object of the present invention further includes providing valves for use in numerous environments, including fuel cells, where the valve is use to control the fuel delivery to the electrodes, and valves for miniature Gas Chromatograph systems for chemical analysis, bioanalysis for both DNA and proteins, multiple flow mixing for micro-reactors, and drug delivery.

A further object is the development of the three-way valve having two separate coils.

Yet another object includes utilizing the valve to act as a modulated pump that can be used in several applications that have low volume flow rate fluidic delivery.

These and other objects, features and advantages of the present invention will become more apparent upon reading the following specification in conjunction with the accompanying drawings.

BRIEF DESCRIPTION OF THE DRAWINGS

FIG. 20 is a close up picture of the inlet hole according to one embodiment of the present invention.

FIG. 21 is an array of microvalves shown in top view.

FIG. 22 is a force versus deflection of the membrane at particular dimensions.

FIG. 38 is a fabrication process of an embodiment of the present microvalve with a permanent magnet being a part of the dome.

DETAILED DESCRIPTION OF A PREFERRED EMBODIMENT

Figure 1:
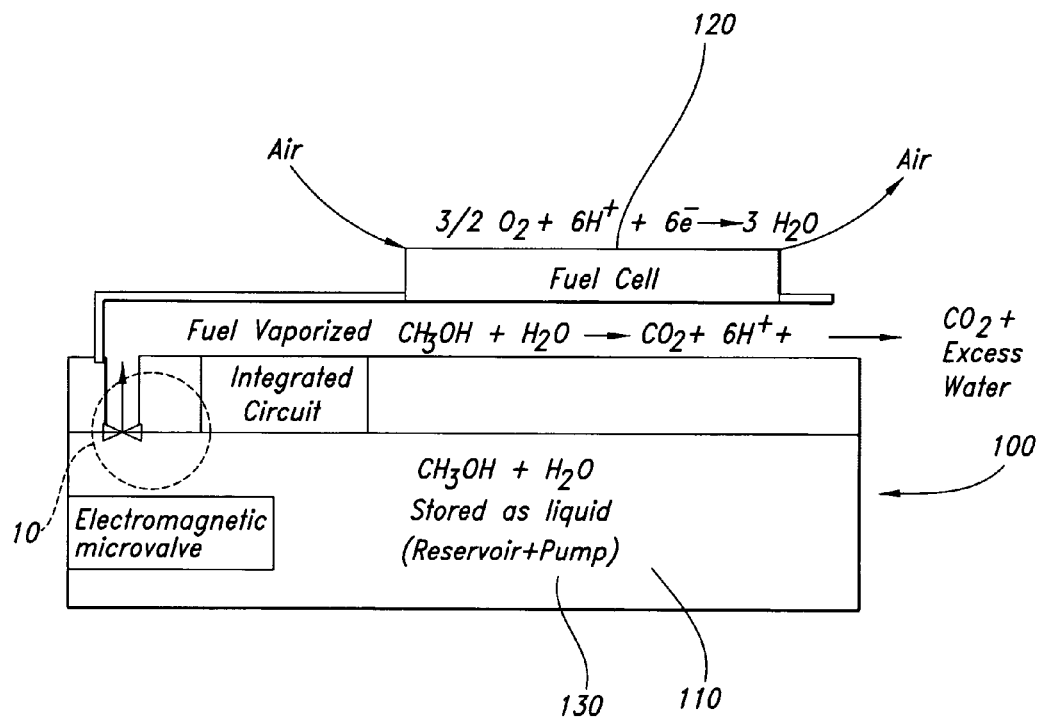
FIG. 1 is a schematic of an integrated fuel cell unit on one wafer.

Referring now in detail to the figures, wherein like reference numerals represent like parts throughout the several views, the present actuating system 5 comprises a microvalve 10 incorporating a valve flow channel 20, a membrane/diaphragm 30, an membrane activating mechanism 40, and a latching system 50. The present actuator is an active device that involves the mechanical movement of a membrane by an electromagnetic driving force.

The geometry of the valve is basically built on a substrate 160 preferable Si wafer. The base of the valve 10 is made from NiFe alloy and a coil 42 built on top of the base. A circular post 15a with the height of 10-20 μm is built in order to have a membrane with dome 32 attached on the edge of the post 15a.

The base of the valve 10 is known as the seat 12, and interfaces with the rest of the micro-fluidic system. The membrane/diaphragm 30 deflects/actuates to close or open the fluid flow. The membrane activating mechanism 40 provides the necessary force to actuate/deflect the membrane 30. In a preferred embodiment, the membrane 30 is a paramagnetic membrane 30, and the membrane activating mechanism 40 is at least one coil 42. Another design involves the fabrication of two coils, top-coil 42a and bottom-coil 42b that create a three-way valve.

The valve seat 12 is the place for the membrane 30 to close the inlet orifice 16. The seat 12 has a gasket 14 on its surface to limit any leaking. The gasket 14 can be made from a softer material, for example, gold, a polymer Parylene or silicon rubber, which may easily deform against the surface asperities in the membrane 30, and cover impurities that may be trapped in the orifice 16 surrounding.

The valve 10 is preferably a latching miniature electromechanical valve. The latching system 50 can include that the membrane 30 is initially provided in a buckled state. The latching system 50 further comprises a magnetic device 52. The valve 10 can be designed such that it is open, and when current is energized through the coil 42, the membrane 30 moves against the valve inlet channel 20.

The magnetic device 52 can be a permanent magnet 54 on the membrane 30 of the valve 10. The permanent magnet 54 and the membrane's residual stress provide a force against the gasket 14 that in turn prevents fluid flow in the closed position. In this embodiment, the valve 10 has a normally closed stable state. When current is applied to the coil 42, it generates a magnetic field in opposition to the permanent magnet 54 and thus releases the diaphragm 30. The spring 42 in the diaphragm 30 then moves the membrane 30 to the other stable location. In another embodiment, a coil 42 is located on the diaphragm 30, and is used to open the valve 10 in place of the magnetic device 52.

Figure 42:
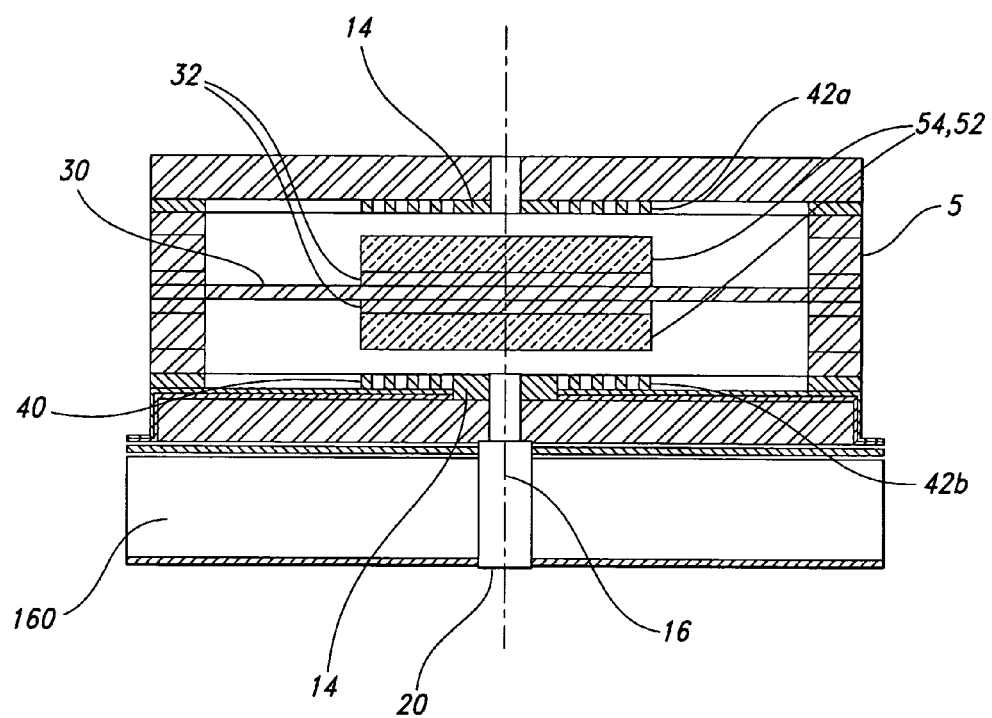
FIG. 42 is a schematic of a microvalve with a flat membrane and two different latching positions provided by two coils with two inlets (top and bottom) and permanents magnets.

In another embodiment as shown in FIG. 42, the membrane 30 is initially in a flat and in an unstressed condition. In order to close the valve 10 from the fluidic flow of the bottom inlet, the bottom-coil 42b is supplied with a constant current to generate the electromagnetic force to pull the membrane 30 downward. The force becomes greater as the distance between the membrane 30 and the bottom coils 42 decreases.

The membrane 30 moves downward until it comes to another stable position, and the current is then turned off, wherein the permanent magnet 54 or magnetic filed generated by a magnetic film provides sufficient force to keep the valve 10 stably closed.

In this condition, the valve 10 is fully opened, and fluid can move freely from the inlets (Top and bottom) to the outlet. Preferably, the distance moved by the membrane 30 between its two stable positions is large enough prevent clogging caused by impurities in a working fluid. The displacement of the membrane 30 is approximately 15 µm, providing an advantage over electrostatically actuated microvalves, wherein the gap is limited to, for example, 1-2 µm.

Generally, in order to close the valve 10 from the fluidic flow of the top inlet, the top-coil 42a is energized with a constant current, to pull the membrane 30 upward, until it comes into a stable position. Hence, for the present microvalve 10, electric power is only used to move the membrane 30 between its two stable positions. Preferably, no power is consumed either to maintain the valve 10 closed or opened.

Since the two stable positions of the membrane 30 are preferably symmetric, the amounts of residual stress are similar. The valve 10 opening and closing times preferably are on the order of approximately 1 ms, and operation time is on the order of ~0.1 ms. These conditions are not achieved using thermal and thermo-pneumatic actuation, which generally require a longer time to close a valve.

Preferably, the valve 10 is a magnetically actuated microvalve 10, and a preferable environment for the present valve 10 includes a complete fuel cell system 100 as shown in FIG. 1. As shown, the complete fuel cell system 100 incorporates three main components: the present microvalve 10, a pressurized reservoir 110, and a micro-fuel cell 120. The reservoir 110 holds a pressurized mixture of water and methanol fuel, or formic acid, and includes an integrated pump 130 that pumps the fuel at a constant force. The function of microvalve 10 is to control the fuel flow from the pressurized reservoir 110 for delivery to the fuel cell 120. The valve 10 is an on/off valve that essentially opens the flow when the membrane 30 fully opens, and chokes the flow when the membrane 30 fully latches by the latching system 50. In such an environment, since the valve 10 is a part of a fuel cell system 100, the ultimate product is power, and thus the design parameters of the present valve 10 are suitable for this operation.

The valve can act as a fluid pump when it is driven with an alternating current. In this case the shape of the waveform can be adjusted along with the shape, in particular taper of the flow channel to achieve a pressure difference.

If the drive frequency is selected at the resonant mechanical mode of natural vibration of the microvalve, then the power input will be lower and the dynamic motion increased.

If the drive frequency is selected at a resonant acoustic vibration mode of the fluid column in the valve channel, which can be shaped as a nozzle, then a large pressure differences may be generated that can produce pumping without requiring the valve to move a full stroke.

If the liquid acoustic resonance is tuned to provide significant gas flow, then the application of this pump to localized electronic cooling by impinging jet of gas from the nozzle could be implemented by placing an array of microactuators over the electronic chip that needs cooling.

In a liquid the acoustic resonance could be tuned to provide breaking of surface tension at a liquid/air interface and release of fluid as a droplet or as an aerosol mist. This can be used for inkjet printing or other fluid dispensing applications in biotechnology or microelectrics or manufacturing.

The power consumption of the present valve 10 should be as minimal as possible. The fuel cell is for generating power of, for example, 1 mW, in which the energy can be stored inside a battery unit. For such power generation, the fuel cell 120 requires the fuel flow rate on the order of 0.08 µl/min. Preferably, in this application, the valve 10 should consume no power while it is fully opened/closed. The power should not be used for continuous operation—in another words—the power should only be used at an instantaneous time, just when the valve 10 opens or closes the flow.

Minimum power consumption for the valve 10 can include providing an integrated buckled membrane 30 with bistable conditions as shown in FIGS. 2(a-c). In structural mechanics, buckling is categorized as a type of failure which is caused by the loss of material stiffness and occurrence in the material instability. This causes the deflection of the material in the lateral direction in order to come to the lowest energy state.

One way that buckling can occur in a beam structure is by having a large compressive stress. The amount of stress is sufficient so that the equilibrium of beam is no longer a straight position but a bent one. However, applying an external force to produce a bent beam in a MEMS application is not desirable. The buckling membrane 30 should be produced as an effect of the fabrication process. Two layers of beams at different thermal expansion coefficients will buckle when one material is deposited at higher temperature, since the thermal stress causes the buckling.

Figure 2A:
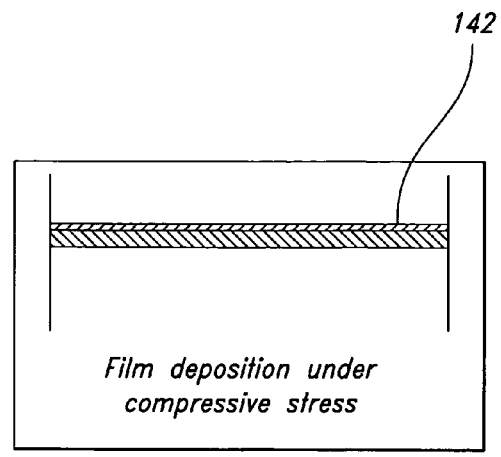
FIG. 2 is an integrated buckled membrane with bistable positions.

As shown in FIG. 2(a), a thin film 142 (<1 µm) under high compressive stress (>MPa) is deposited at high temperature on top of a beam 144, which is originally stress free. Under this condition, the film 142 will experience an intrinsic compressive stress generated from the deposition process, and the difference in the thermal expansion coefficient between the thin layer ($\alpha_L$) and the beam ($\alpha_B$). The force generated by a temperature change T when the layer and beam are equal in thickness is given by:

$$F = \frac{(\alpha_2 - \alpha_1)T}{8} \frac{hb}{\left(\frac{1}{E_1} + \frac{1}{E_1}\right)}$$

Where $E_1$ and $E_2$ are the Youngs Modulus of the two materials, $\alpha_1$ and $\alpha_2$ are the thermal expansion coefficients, h is the total beam thickness, and b is the width of the beam. Additional formulas for other geometries and film thickness and boundary conditions are given in the book by Timoshenko (Theory of Plates and Shells, 1979, McGraw Hill).

Figures 2B, 2C:
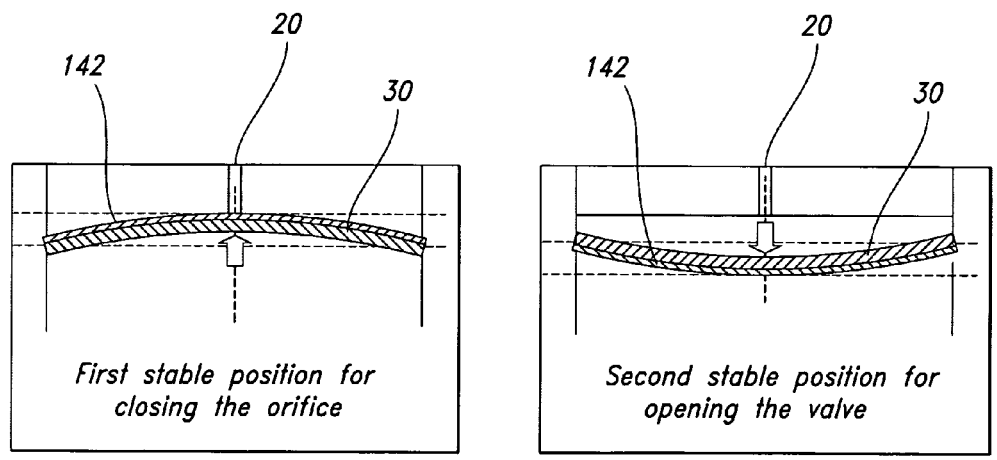

The compressive stress of the film can be sufficient large so that the beam buckles as it comes to the room temperature. Instead of a beam, the same condition can be applied for a membrane. The buckled membrane 30 structure can be utilized for a valve 10 operation. As shown in the FIG. 2(b), the first buckling position can be utilized to close an orifice 16. If a sufficient external force is applied to the membrane 30 in the downward position, the valve 10 will come to the second stable position, which fully opens the inlet orifice as shown in FIG. 2(c).

Figure 41:
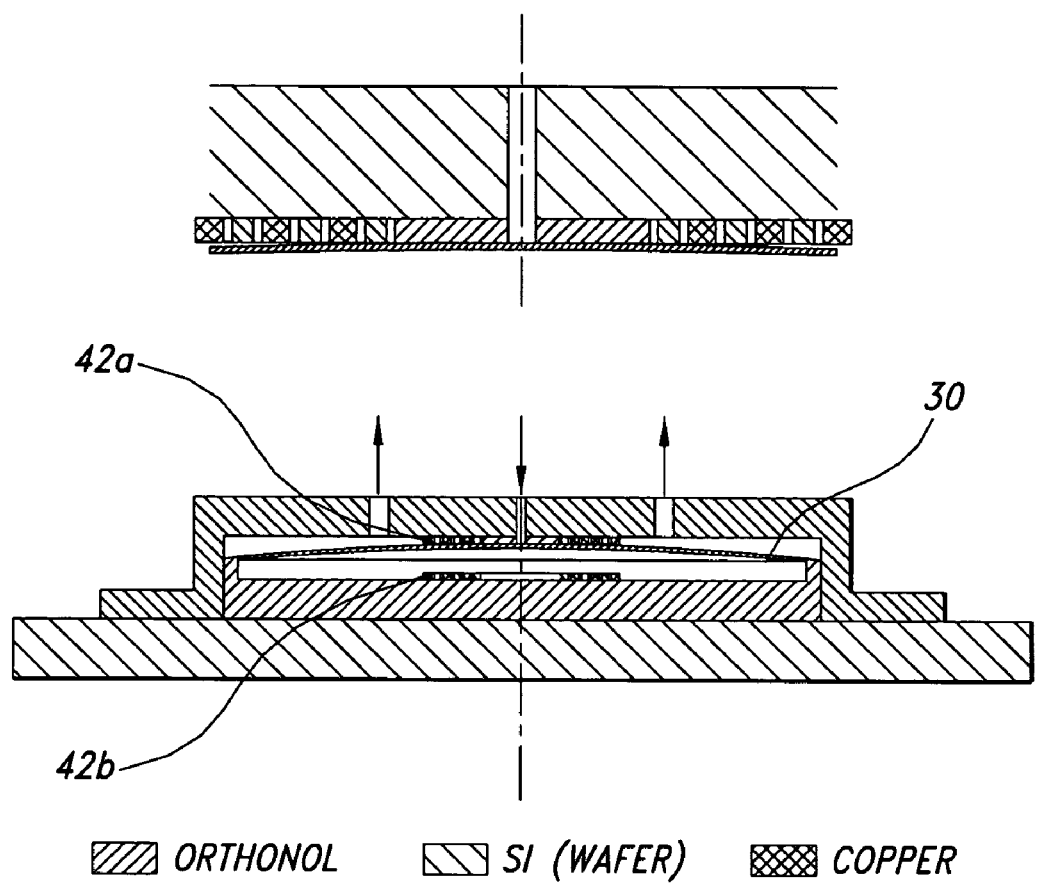
FIG. 41 is a schematic of a microvalve with a buckled membrane, top, and bottom coils.

In FIGS. 2(b-c), the force is required just to open or close the orifice—there is no force required to hold the valve 10 in the opened/closed position. This consequently minimizes the valve 10 power consumption. The schematic of a microvalve that has a buckled membrane that has two stable positions and two coils, top coil 42a and bottom coil 42b, is shown in FIG. 41. As shown, the valve can be either normally closed or in an opened position.

Figure 3A:
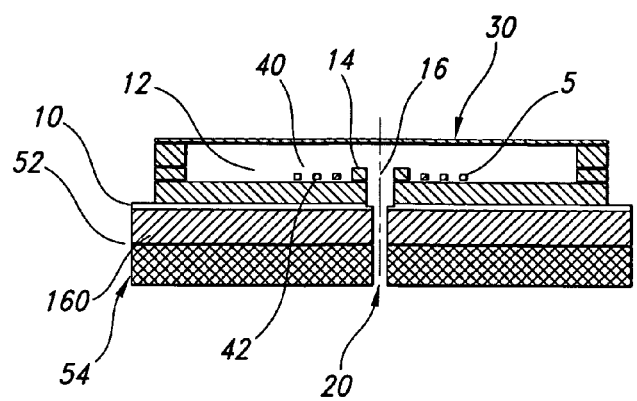
FIG. 3 is a schematic for implementing permanent magnet for power reduction.
Figure 3B:
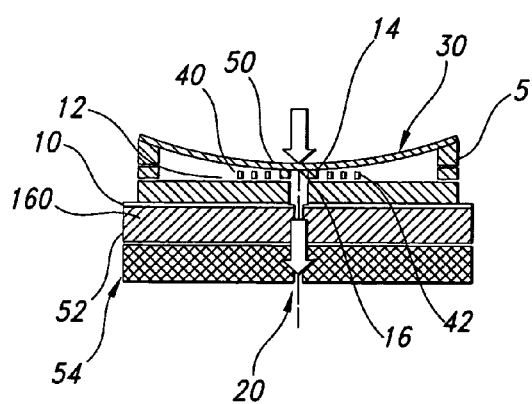
Figure 3C:
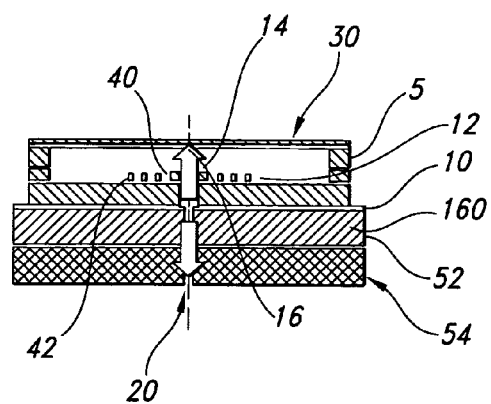

Minimum power consumption for the valve 10 can include yet another embodiment, that being to implement a permanent magnet 54 for the bistable membrane 30, as shown in FIGS. 3(*a-c*).

FIG. 3(*a*) illustrates a simple structure of the electromagnetic actuated microvalve 10, the valve structure formed in such away to produce a close loop magnetic circuit 150, made from a magnetic material 52, preferably a soft magnetic material like Orthonol (50% Ni and 50% Fe). The structure is built on a silicon substrate 160, with a permanent magnet 54 attached on the back of the wafer 160. A coil 42 is built into the structure in order to produce an electromagnetic field that produces the force that actuates the membrane 30. Under the normally open condition, as shown in FIG. 3(*a*), there is no current input in the coil 42, and the force from the permanent magnet 54 is not strong enough to deflect the membrane 30.

FIG. 3(*b*) shows the state of the valve 10 in the closed position. In this condition, a current is drawn in the coil 42 to produce an electromagnetic force in the same direction as the magnetic force. Both forces pull the membrane 30 downward until it touches the gasket 14 and chokes off the flow. Once the membrane 30 latches the inlet orifice, the current is switched off, and a sufficient force from the permanent magnet 54 holds the membrane 30 in this latching position.

FIG. 3(*c*) shows the mechanism of the valve 10 in order to fully open the flow. The upward movement of the membrane 30, which opens the inlet orifice, comes from the repelling force from the permanent magnet 54 and the coil 42, as a reserved current is drawn to the coil. This force is sufficient enough to place the membrane 30 into its flat, stable position.

Implementing a permanent magnet 54 on the valve structure saves operational power, is simple, and enables a relatively easy fabrication process. Instead of placing the permanent magnet 54 on the back of the wafer 160, it can be electroplated on the bottom surface of the membrane 30 or on the dome 32. Yet, it will be understood that a magnetic device 52 can be so placed on the back of the wafer 160. Electroplating, though, provides that the magnet is an integrated layer of the membrane 30. Such integration gives better performance than placing the permanent magnet 54 on the back of the wafer 160. Further, due to the proximity with the coil 42, the size of the magnet 54 necessary is reduced.

Having two coils for the valve with a flat membrane and a permanent magnet 54 gives the opportunity to create three-way valves as shown in FIG. 42. For this valve, there are two inlets: top and bottom. The outlet is by the side of the valve 10. The valve 10 has two latching positions and one flat stable position. These positions are very useful for drug delivery and fluidic mixing. By applying a modulating current and a certain lagging time between the top and bottom coils, the valve can react as a modulating pump. It is very useful for the drug or any fluidic delivery for a small volume flow rate.

Figure 44:
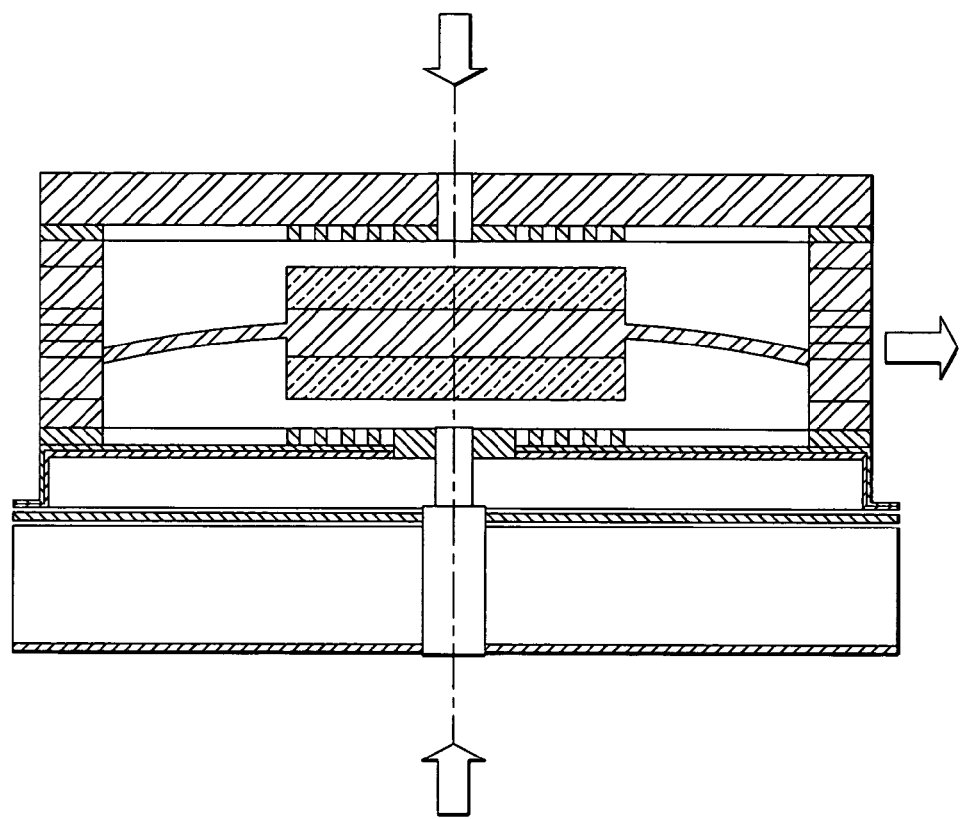
FIG. 44 is a schematic of 3 way-valves with four holding positions (two stable positions and two latching positions) which is achieved by the combination of permanents magnet on the dome of a buckled membrane and two coils (top and bottom)

Having two coils and a buckled membrane 30 with permanents magnet 54 as the dome 32 as shown in FIG. 44 may produce 4 holding positions for the membrane 30. As shown in the figure the membrane 30 is initial buckled upward, this is named as the first stable position. If sufficient current is applied to the top-coil 42*a*, the membrane 30 will eventually move more upward and finally touched the top orifice, the current is then turned off and the permanent magnet 54 force hold the membrane into first latching position to the top orifice. If a current is drawn to the bottom-coil 42*b*, a downward electromagnetic force is produced and brings the membrane into the second stable position. If sufficient current is applied to the bottom-coil 42*b*, the membrane 30 will eventually move more downward and finally touched the bottom orifice, the current is then turned off and the permanent magnet 54 force hold the membrane into second latching position to the bottom orifice. By having 4 holding positions for the membrane 30 on the vertical direction, the volume flow rate of the fluid can be controlled.

Figure 45:
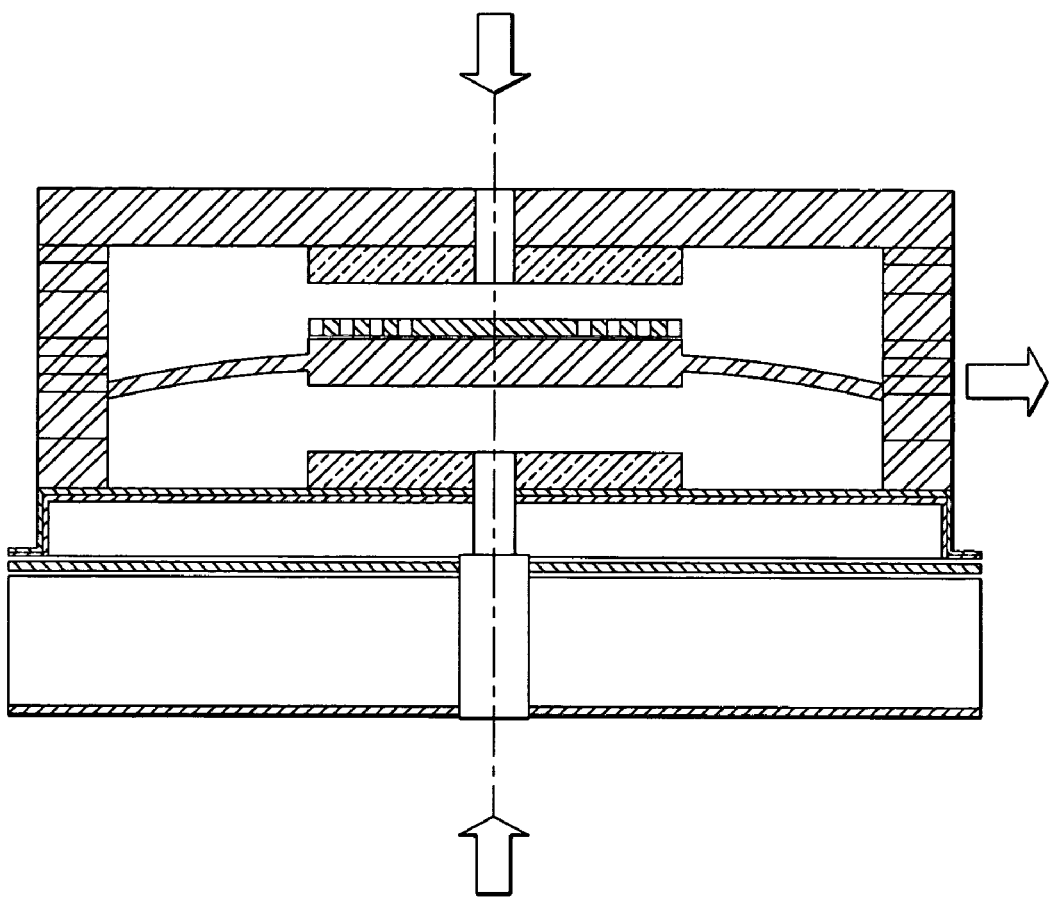
FIG. 45 is a schematic of 3 way-valves with four holding positions (two stable positions and two latching positions) which is achieved by the combination of coils on the buckled membrane permanents magnet on the inlet orifices

Having one coil plated on the buckled membrane 30 with permanents magnet 54 plated on the top and bottom orifice as shown in FIG. 45 may also produces four holding positions for the membrane 30.

Figure 46:
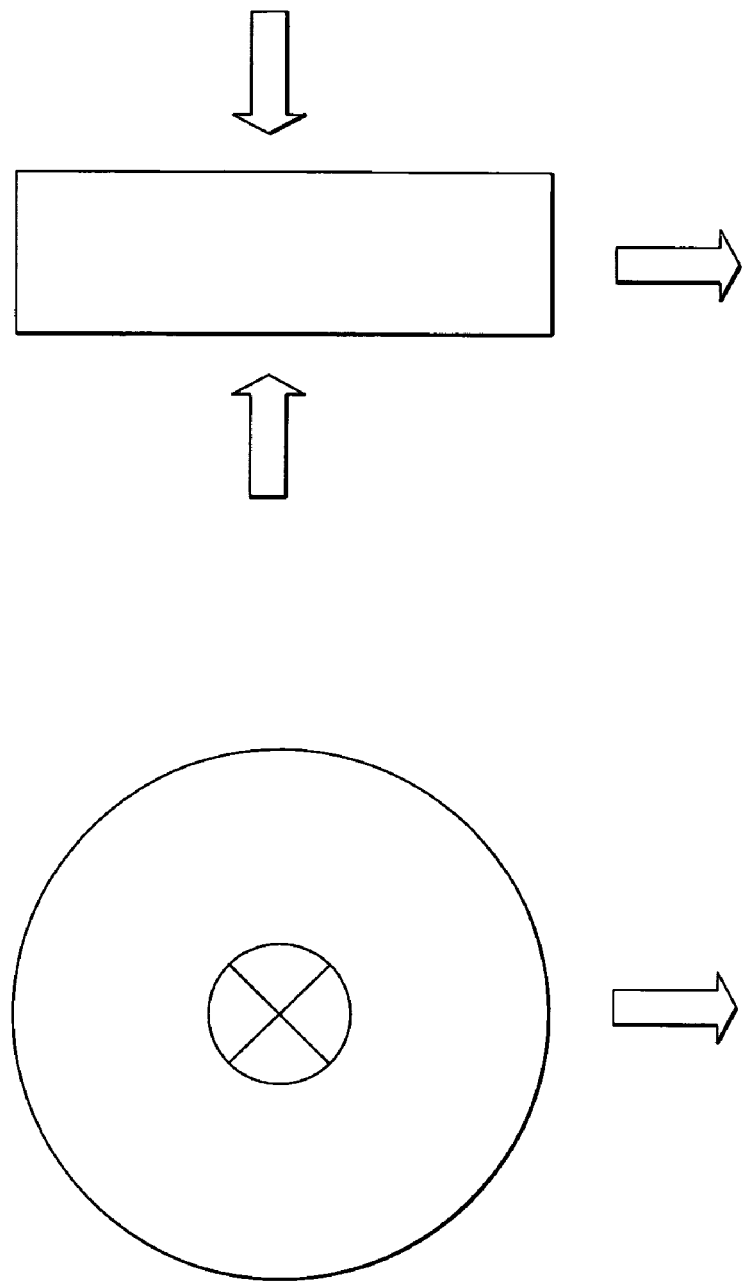
FIG. 46 is a schematic idea of three way valves with two inlets (top and bottom) and one outlet on the sides of the valve
Figure 47:
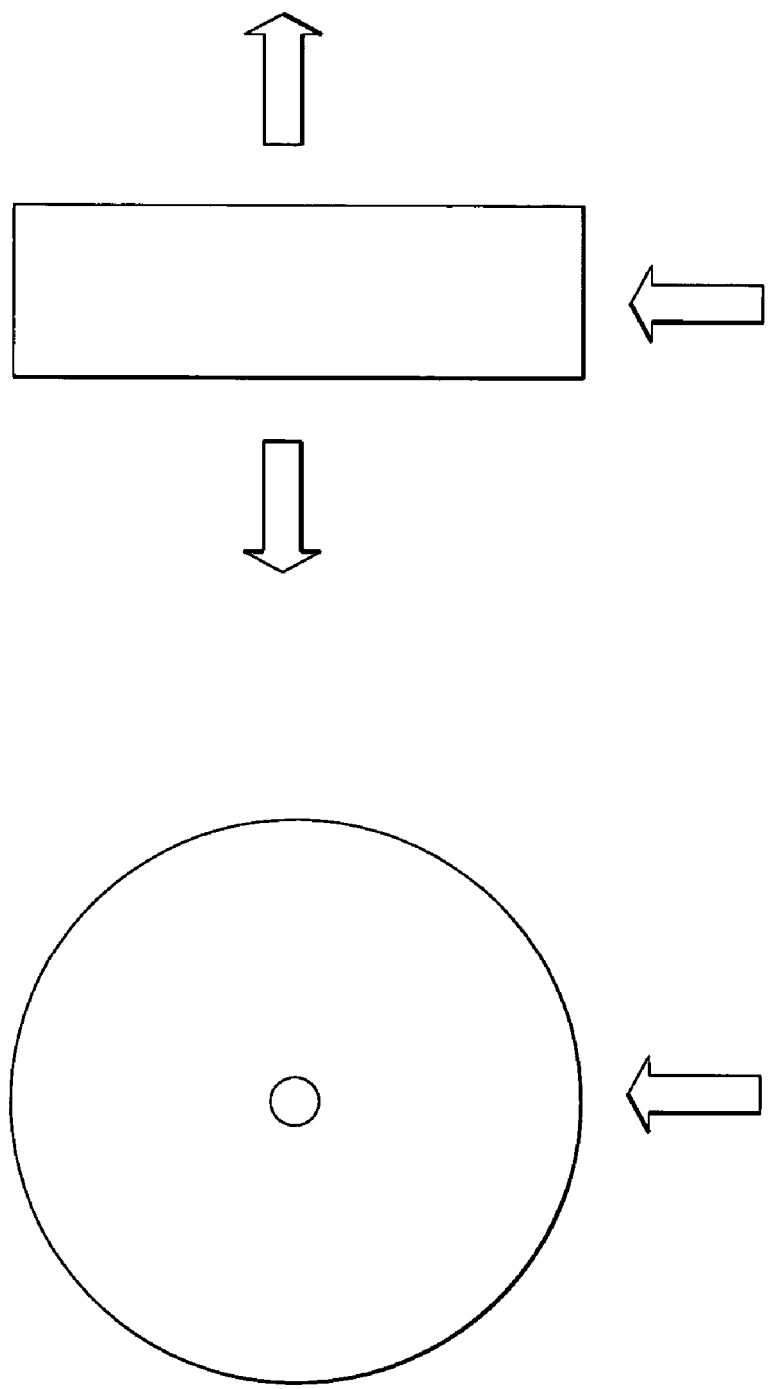
FIG. 47 is a schematic idea of three way valves with two outlets (top and bottom) and one inlet on the sides of the valve

Instead of having top and bottom inlet and the side of the valve 10 as the outlet of the fluidic flow as shown in FIG. 46, the same three way valve 10 can also have one inlet by the side of the valve 10 as shown in FIG. 47 and two outlets (top and bottom).

Figure 48:
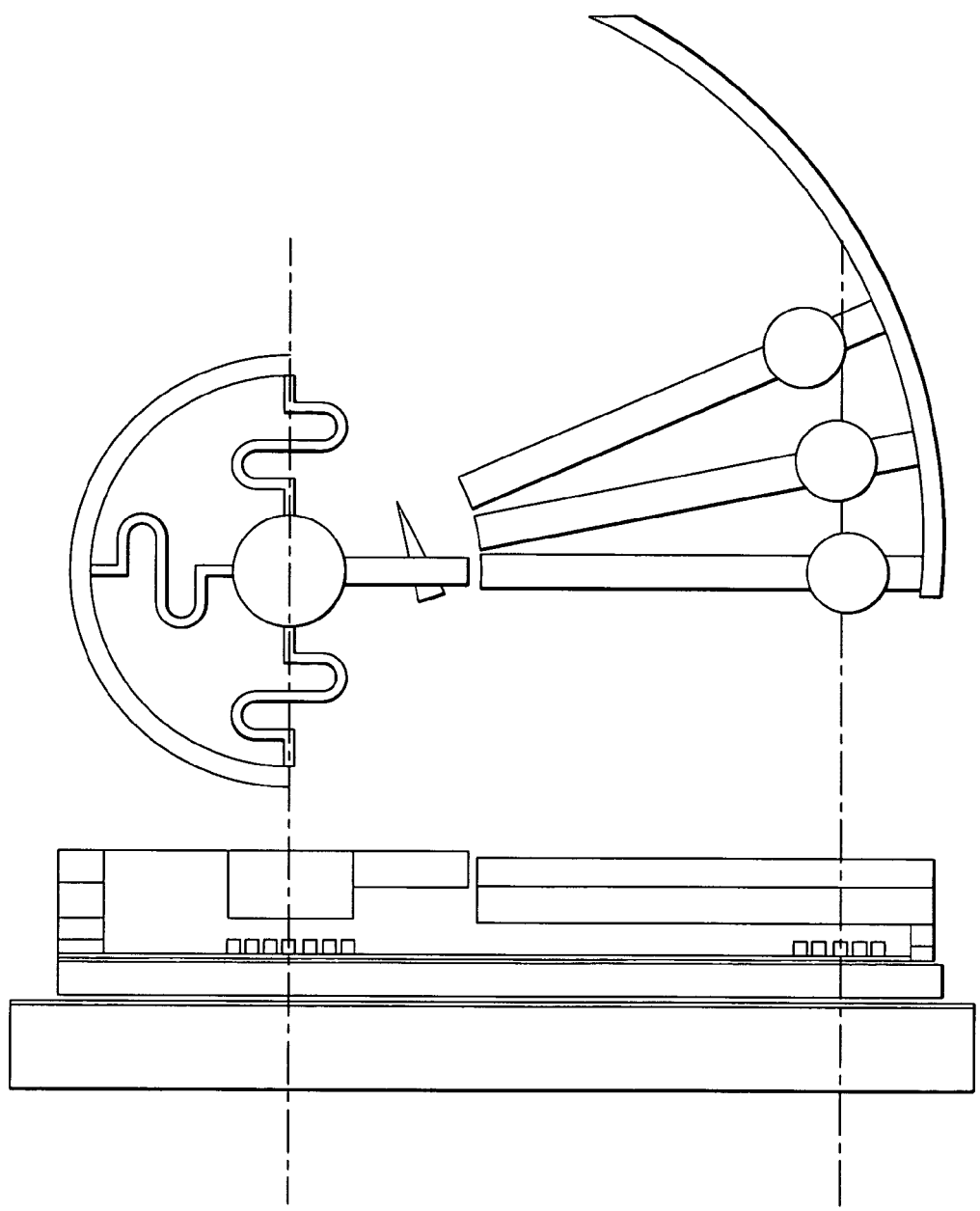
FIG. 48 is a schematic of the variable valves achieved by the membrane rotation that have Torsional legs, in which the membrane has three possible holding location achieved by rotation

FIG. 48 shows the idea of controlling the volume flow rate of the liquid by having 3 holding position of the membrane 30 that is achieved by rotation of the membrane 30 that is attached on the Torsional overhanging legs. The position of the membrane 30 is rotationally controlled by three coils 42 that generated flux which guide the magnetic field of the system to the preferred angle.

Preferably, the present microvalve 10 is inert and non-reactive in operation, which would be important in an environment like a fuel cell. The fuel cell is for power production, and thus minimal, if any, reaction can be permitted during valve 10 operation. This necessarily eliminates the possibility of using thermally actuated microvalves, because the heating from the heating element may introduce an additional reaction in the fluidic flow.

An electromagnetic actuated valve 10 can be categorized as a safe candidate for the operation, as there is almost no heating in the process. In order to produce an efficient magnetic field during valve 10 operation, a closed loop valve structure as shown in FIG. 3(*a*) can be used. A majority of the structure is made from a soft magnetic material—Orthonol, (50% Ni and 50% Fe). Since the structure is made of metal, and as it is exposed to mixture of water and methanol, there is a possibility that some corrosion will occur on the structure surface. To minimize this problem, the structure can be coated with a thin protective layer.

Preferably, the present microvalve 10 further has a minimum of clogging due to impurities in the fluid flow. While there is no fluid that has absolutely no impurities, in the MEMS application, the impurities sizes are an unpredictable, but nonetheless important, issue. A beneficial valve design has an adequately large opening to prevent the clogging caused by fluid impurities. At the same time, the valve size should be small enough for MEMS application. A large deflection in a small compact valve-volume is highly recommended for a good valve design. Generally, for a highly purified liquid flow, with a particulate size of less than 1 μm, a valve opening larger than 10 μm is required.

Additionally, the present microvalve 10 incorporates low closing/opening times for the membrane/actuator. In most MEMS application, long closing or opening times for the microvalve is not desirable. For example, in the spacecraft application, the opening/closing speed should be less than two second.

Equal time for valve opening/closing is also important in some applications, although for thermal actuated microvalves, this condition generally does not exist. Yet, it may be achieved by piezoelectric or electromagnetic actuation.

The inlet orifice 16 size of the present valve 10 is preferably sufficiently large to avoid or minimize surface tension and choking problems. Choking occurs when the "Mach" number is greater than 1. This is an extreme case, because most flows in MEMS usually have a relatively small Reynolds number, and the flows are typically laminar inside the orifice. This problem may exist at the first valve-opening at high crushing pressure. A significant jump in the pressure drop may produce choking effect.

The present microvalve 10 fabrication is CMOS compatible, a challenge in the prior art. Preferably, the fabrication temperature is less than 300° C. Electroplating is a simple fabrication process that is CMOS compatible because the fabrication temperature is nearly at ambient. Electroplating can be used to form the soft magnetic alloy or metal structure embodiment of the present valve 10.

While most of the current microvalves involve bonding two wafers together to make the fluidic connection, bonding two wafers is simply not desirable for most MEMS application, particularly for the micro-fuel cell. The present invention overcomes this deficiency in the current art, and provides a microvalve 10 fabrication process that incorporates the microvalve 10 on the same wafer 160 as the fuel cell system to power up an integrated circuit (IC) that is also built on the same wafer 160. Since the valve 10 is built on a single wafer 160 process, it is CMOS compatible.

The CMOS compatible microfabricated microvalve 10 is less expensive to manufacture than previous microvalves because of the CMOS compatible processing. The present microfabricated valve 10 is smaller than heretofore known MEMS valves, so it is less expensive to build because more devices can be produced on each wafer 160. Further, the single substrate microvalve 10 of the present invention is less expensive to manufacture because there is no need to carry out steps of alignment and bonding of multiple substrates together. These alignment and bonding processes typically result in a lower yield of good devices in a manufacturing process. The single substrate microvalve 10 is also more reliable in operation, as it is built on one substrate with CMOS compatible processing. Reduction in reliability normally associated with bonding and alignment of components in a multi-substrate stacked valve is avoided.

The present valve 10 further incorporates other beneficial characteristics, depending on the environment. In the preferred fuel cell environment, the valve 10 is designed to protect against minor shock, vibration, and temperature fluctuations.

The present valve 10 is preferably electromagnetically actuated with a bistable condition. The present electromagnetic actuated membrane 30 is implemented due to its advantages in the operation of the valve 10 as discussed in Table 1. In order to reduce the power consumption in its operation, the permanent magnet 54 is implemented in the structure in order to hold the membrane 30 in a latching position, as shown and discussed in FIGS. 3(a-c). By having bistable positions, there is no current/power required when the valve 10 is fully opened or closed, and this significantly reduces the operational power, as well as increases the functionality of the valve 10.

The permanent magnet 54 can be either attached on the back of the substrate, preferably a wafer 160, or electroplated as a part of the membrane 30 layer. The former method does not required additional fabrication of the valve 10, and is more practical. The latter method required additional fabrication of the permanent magnet 54, and is preferable for batch fabrication processes.

The membrane 30 can include a centered dome 32 and overhanging leg 34. The membrane 30 design of the valve 10 was challenging, because it should have a sufficient stiffness that prevents buckling during the fabrication process. Yet, it should not be too stiff so that the magnetic force is not sufficient to deflect the membrane 30. All the while, membrane 30 design and modeling using ANSYS 5.7 was developed in order to achieve a desirable membrane 30.

Figure 4A:
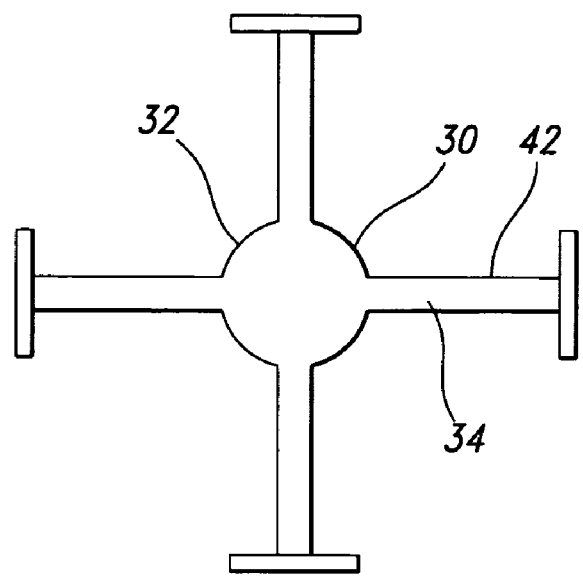
FIG. 4 is a schematic view of the membrane.
Figure 4B:
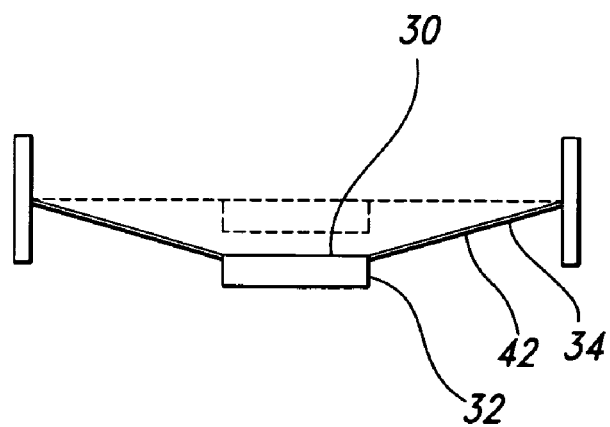
Figure 39A:
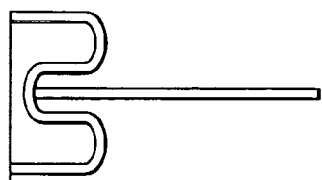
FIG. 39 illustrates different shapes of supporting leg: Stress free, Torsional, and Low Tension supporting legs, respectively.
Figure 40A:
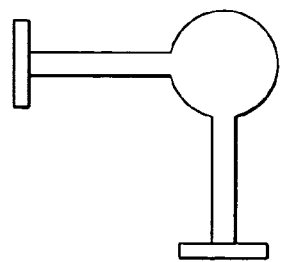
FIG. 40 illustrates different membranes with different numbers of supporting legs.
Figure 39B:
Figure 40B:
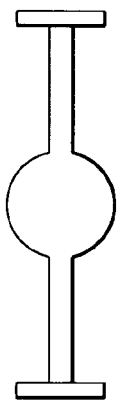
Figure 39C:
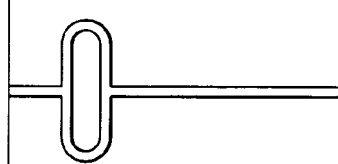
Figure 40C:
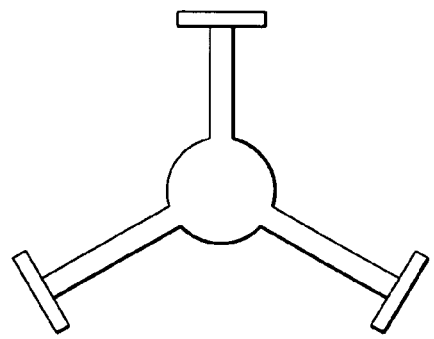

The preferred membrane 30 comprises a dome 32 that is supported by two, three or four legs 34 of cantilever beams as representatively shown in FIGS. 4(a), 40 and 21. As shown, the center dome 32 is thicker than the cantilever beam. This type of design ensures that the center dome 32 is stiffer than the beam, and thus it should not experience a significant amount of deformation, if at all, during its movement. FIG. 39 shows the three different shapes of the supporting legs that have been generated in the valve fabrication. It has its own characteristics and mechanical advantages. FIG. 40 shows the three possible different numbers of supporting legs, wherein a lesser number of legs will lower the stiffness of the membrane as well as create the possibility of the membrane to tilt (two legs, 180 apart) or rotate (torsional support).

Figure 43:
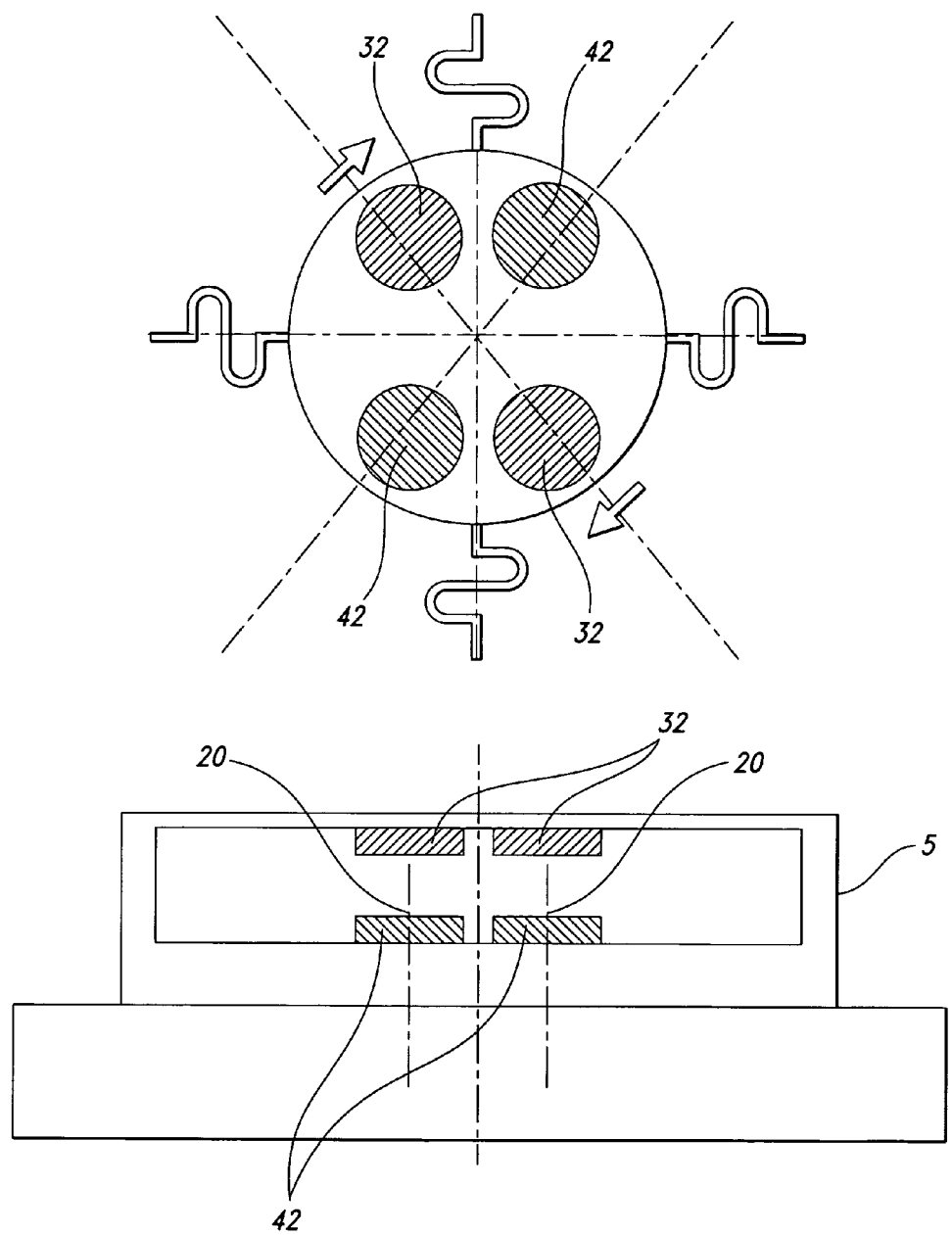
FIG. 43 is a schematic of a torsional membrane with the rotational movement provided by two separate coils and domes combination.

The torsional membrane design as shown in FIG. 43 gives the possibility for the membrane to rotate. The two coils and two domes combination, left and right sides, give the direction for the membrane to rotate and move downward to a latching position. For this design, the inlets can be located on the back of the wafer—meanwhile the outlet can be by the side of the valve.

Three types of membrane 30 designs are considered and modeled by FEA with the overall sizes of 1000 µm, 1500 µm, and 2000 µm. The cantilever legs 34 and the center dome 32 preferably have a thickness of 3 µm and 10 µm, respectively, although ranges of 0.2 to 25 µm are possible. Another reason to incorporate a thicker dome 32 is to prevent the magnetic saturation inside the membrane 30. Such a phenomenon is investigated in ANSYS 5.7.

The present device can further incorporate circular coils 42 for magnetic actuation. Since the preferred membrane 30 is in the circular form, the electromagnetic coils 42 can also designed in the same pattern. Different coil sizes and numbers of coil turns are modeled in ANSYS 5.7, in order to get the best coil geometry. As shown in the FIG. 3(a), the center of the coil 42 also defines the inlet orifice.

The flat dome 32 design as well as the centered inlet orifice ensures that the flow will be choked as the membrane 30 fully latches the orifice. In order to have an efficient magnetic field, the number of coil 42 turns can limited by the size of centered dome 32. The coils 42 are patterned in such away that they cover the bottom space of the dome 32. Based on FEA by ANSYS 5.7, the additional coils 42 outside the perimeter of the centered dome 32 will produce insignificant magnetic flux.

Figure 5:
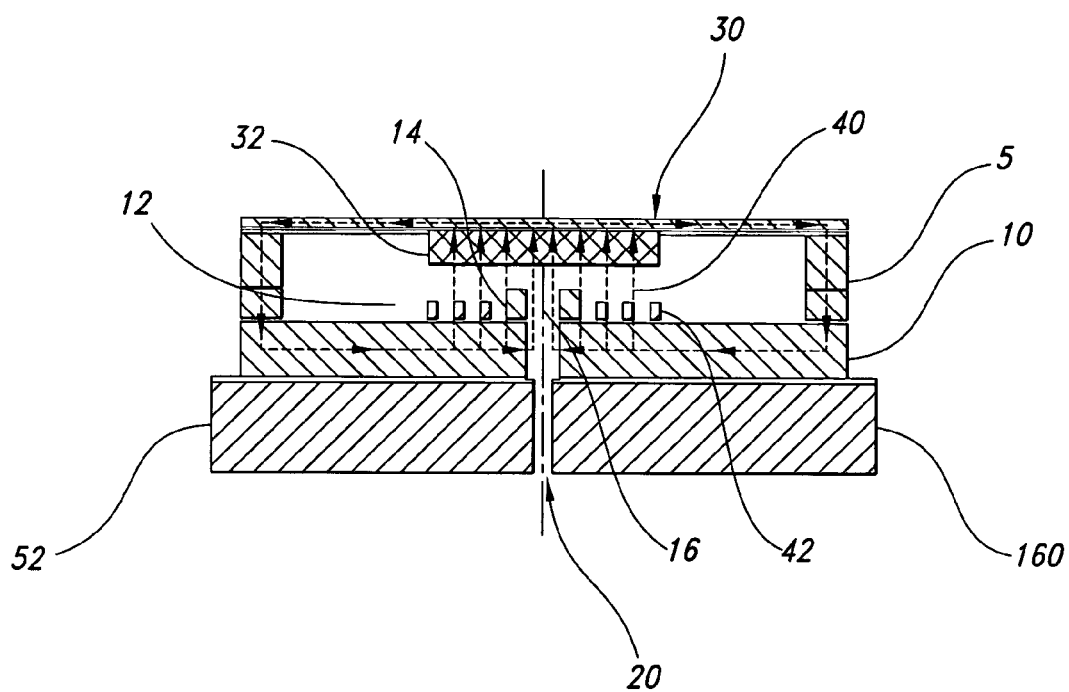
FIG. 5 is a magnetic field flow inside a closed loop magnetic structure made from soft magnetic material (Orthonol is a 50% Ni and 50% Fe).

The present invention further preferably includes a closed loop magnetic circuit 150, defined as providing a magnetic field that is directed inside the soft magnetic material structure. This design minimizes the possibilities of magnetic leakage through an unnecessary air gap. A closed loop magnetic structure further minimizes the value of magnetic reluctance, which is equivalent to the electrical resistance in the electric circuit. This, consequently, increases the efficiency of the magnetic flux in producing electromagnetic force through the membrane 30 center. The magnetic field flow in a closed magnetic structure made from Orthonol is shown in FIG. 5.

The proper selection of magnetic material for the valve 10 is important. An ideal soft magnetic material should have an infinite magnetic saturation ($B_s$) and zero coercivity ($H_c$). The selection of a soft magnetic material should have a large number of magnetic saturation values ($B_s$) and a small number of coercivity ($H_c$). There are a few soft magnetic materials available for MEMS fabrication. They include Permalloy (80% Ni, 20% Fe), Orthonol (50% Ni, 50% Fe), and CuFeCo (80% Co, 2% Fe, 18% Cu) or Permadour (an alloy used in loudspeaker manufacture with high magnetic saturation of ~1.9 T). Table 2 illustrates some of the properties of a few candidates of soft magnetic materials.

TABLE 2

| Alloy | Composition | Magnetic Saturation, Bs (T) | Coercivity, Oe (T) | Youngs Modulus, E (GPa) | Yield Strength (GPa) | Ultimate Strength (GPa) |
|---|---|---|---|---|---|---|
| NiFe (Permalloy) | 80% Ni, 20% Fe | 0.9 | 0.65 | 65 | 0.93 | 1.034 |
| NiFe (Orthonol) | 50% Ni, 50% Fe | 1.41 | 1.3 | 119 | 0.73 | 0.62 |
| CoFeCu | 80% Co, 2% Fe, 18% Cu | 1.3-1.6 | 6.0-10.0 | — | — | — |

Table 2 illustrates that Permalloy and Orthonol are more likely candidates for the soft magnetic material to build the present valve 10, as they have relatively high magnetic saturation and small coercivity. Orthonol is chosen as the material for the valve structure 10 as shown in FIG. 5.

Figure 6:
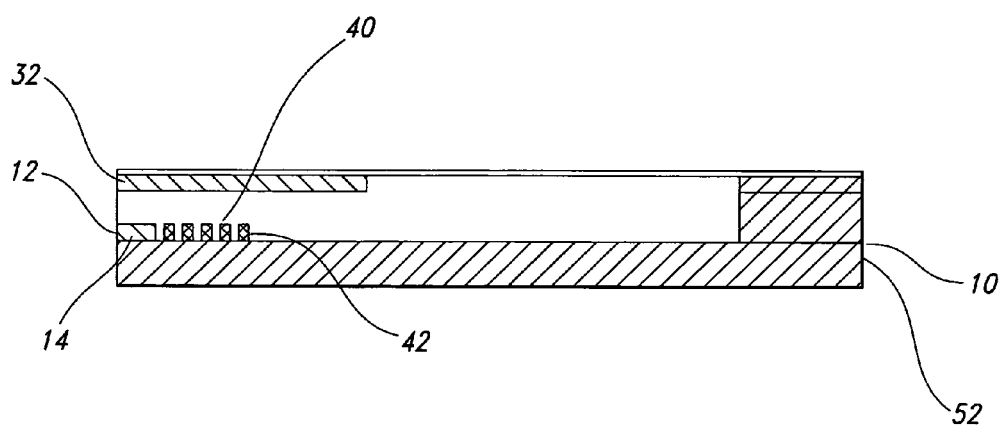
FIG. 6 is a second magnetic model for FEA in ANSYS 5.7.

FIG. 6 shows a simple 2D magnetic model rendered in ANSYS, which was developed in order to determine the amount of force produced by the electromagnetic coil as well as to investigate the saturation and the magnetic behavior inside the present valve structure. A 2D Axisymmetris model was been done in ANSYS 5.7 using element PLANE 53. A sample of the model generated in the analysis is shown in FIG. 6. It illustrates the analysis for the coils 42 of 7.5 μm×7.5 μm, with the possibility to insert Orthonol in between.

Figure 7:
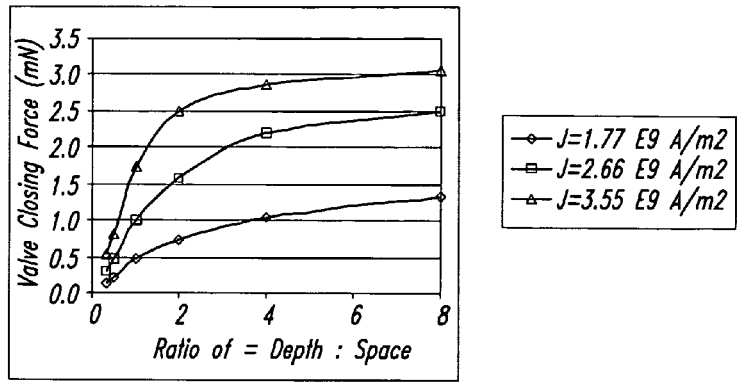
FIG. 7 is the generated magnetic force at different number of coils.
Figure 8:
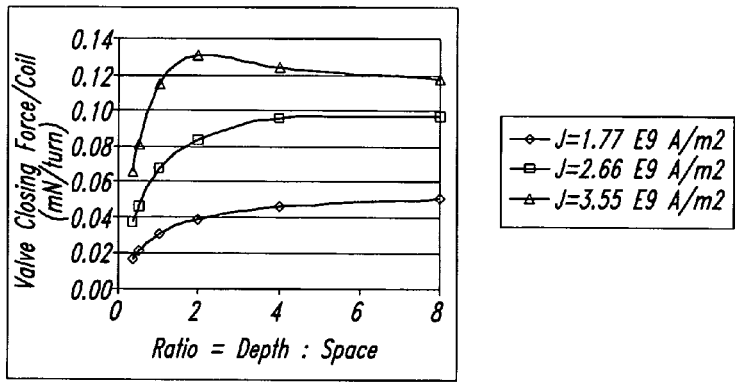
FIG. 8 is the generated magnetic force at different number of coils.

FIGS. 7 and 8 show the results of the generated magnetic force and magnetic force/coil 42 at different ratio and current density. The spacing ratio is determined by the ratio of "coil depth": "coil space". A higher ratio refers to a larger number of turns in the coil.

FIG. 8 shows that there is an optimum value in the generated force/coil 42 at the current density of $J=3.55$ E9 $A/m^2$. This indicates that the saturation has already occurred at the aspect ratio of two, which correspond to the spacing between coils 42 of 2×7.5=15 μm. There is no optimum value for the other current density because no saturation has occurred.

Figure 9:
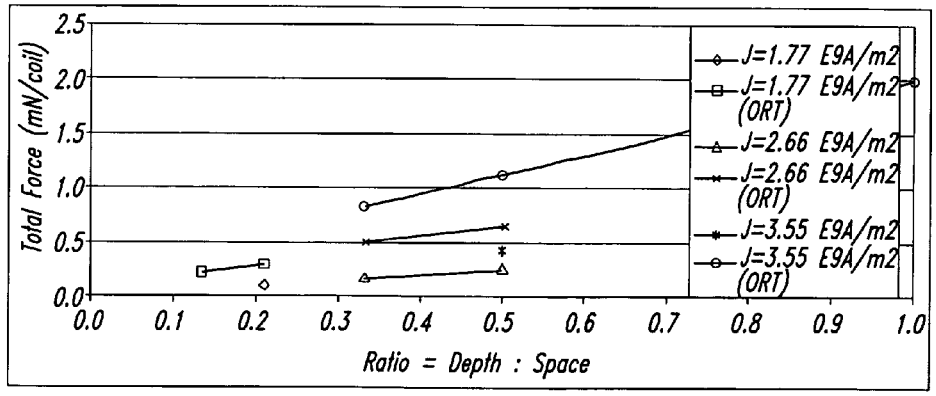
FIG. 9 is a comparison in the electromagnetic force generated on the membrane with and without Orthonol.

FIG. 9 shows the comparison in the electromagnetic force generated on the membrane 30 with and without Orthonol. It shows there is a significant increase in the generated force when Orthonol is inserted in between the coils 42. For example, on the ratio of 0.5 and the magnetic current density of $J=2.66$ E9 $A/m^2$, the force generated with Orthonol is 1.2 mN, in comparison to 0.72 mN without Orthonol. Since the additional of Orthonol will generate higher magnetic force at the same power consumption, this improves the power optimization of the present microvalve 10.

In order to model a more complex geometry of the valve 10, and to investigate both the structural and the magnetic behaviors of the valve 10, a 3D model was created in ANYS 5.7. The structural analysis presents the results of stress and displacement of the membrane 30. The magnetic analysis presents the magnetic force experienced by the membrane 30, the magnetic flux, and the magnetic field in the valve structure. 3D Element model, with SOLID 98 element, was chosen to model the valve structure. This element has the capability to couple between the magnetic and structural analyses of the model. It has a non linear geometry, large deflection, and stress stiffening behaviors in the structural analysis.

Figure 10:
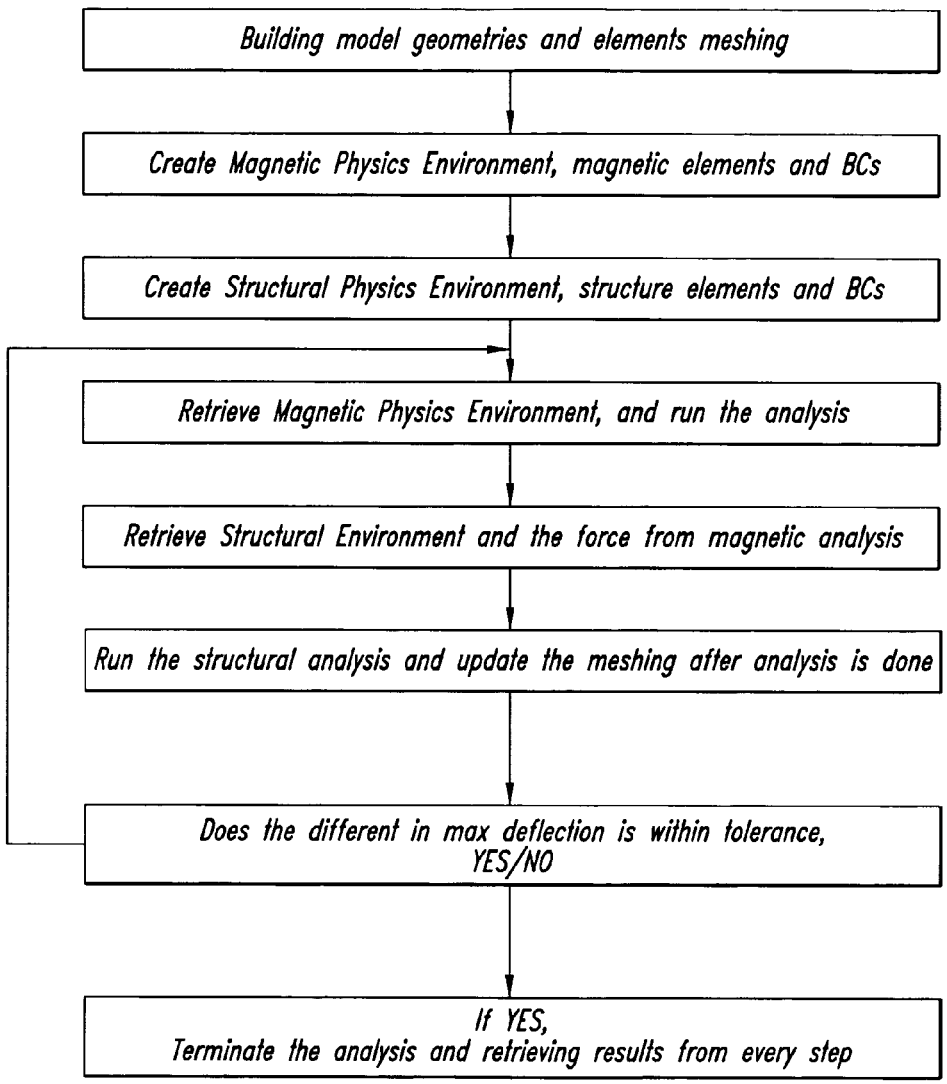
FIG. 10 is a schematic loop to couple the magnetic and structural analysis in ANSYS 5.7.

Since ANSYS 5.7 does not have an available direct macro command that couples the magnetic and structural analysis, two physics environments were created separately in the model, and then the results from the magnetic analysis were applied to the valve structure. FIG. 10 schematically shows the loop that was developed in order to couple the magnetic and structural analysis for the valve 10.

As shown FIG. 10, element remeshing has to be done after the two (Magnetic and Structural) analyses are finished, to ensure the convergence behavior of the analysis. Since then, a number of loops were made until the convergence is finalized. For example, in one analysis, 45 times of loops were made in order to get the results to converge. This usually takes more than 24 hours.

Figure 11:
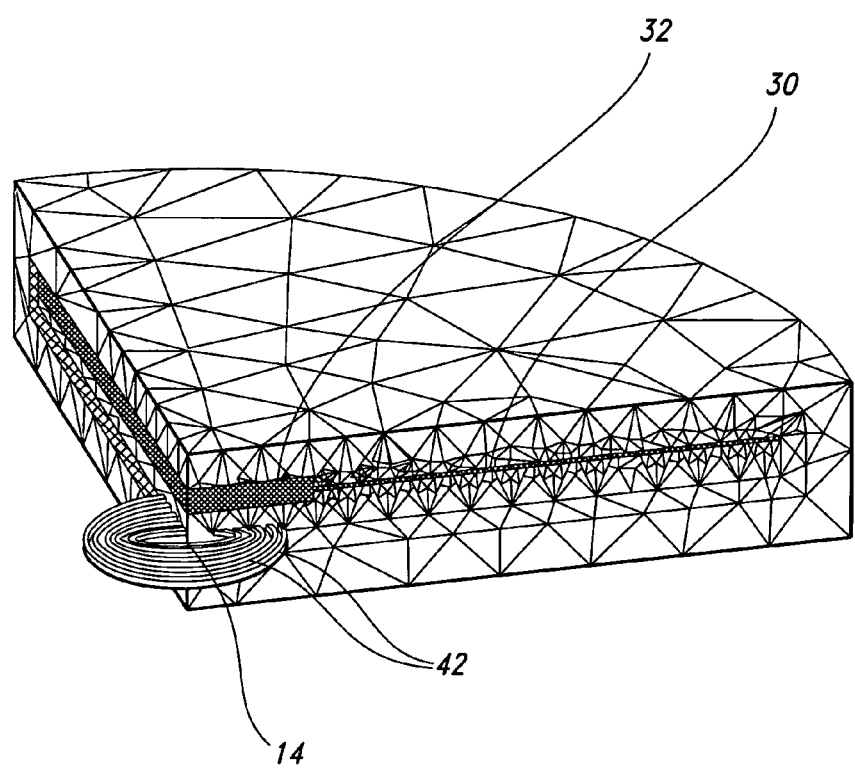
FIG. 11 is a third model developed in ANSYS 5.7 for coupled field analyses is a magnetic and structural.

FIG. 11 shows the 3D model geometry that was developed in ANSYS 5.7 using element SOLID 98. As shown, the valve structure is basically a flat membrane 30 with a thicker centered dome 32 and 4 (four) thin cantilever legs 34, gold coils 42, gasket 14, and valve base 12. A particular geometry as shown in FIG. 11 was studied for the combined structural and magnetic analyses. The analyses were run at different current flow and gaps between dome 32 and gasket 14. Instead of having a flat membrane 30, a different model with the buckled membrane 30 was also developed for analysis. Another type of model, with Orthonol inserted between the coils 42 was also developed.

Figure 12A:
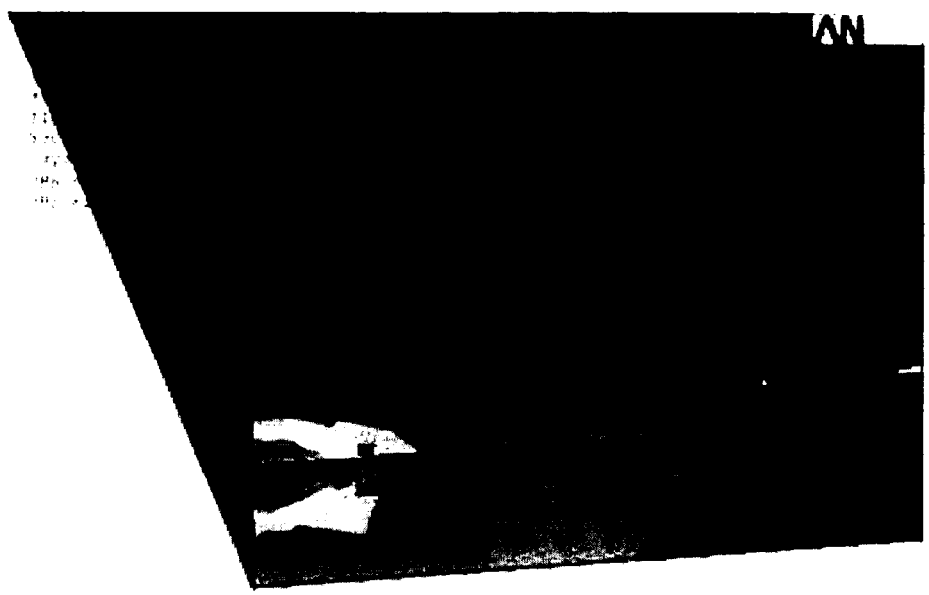
FIG. 12 is a the magnetic results of the third model developed in ANSYS 5.7 for a particular geometry without Orthonol.
Figure 12B:
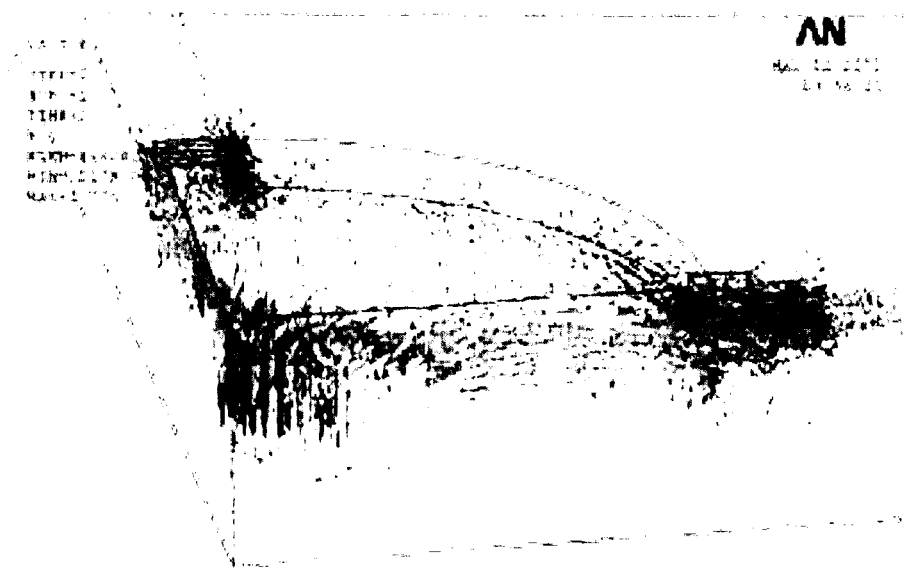

FIG. 12 show results just before the membrane 30 touches the gasket 14. FIG. 12(a) shows that the saturation (B>1.4 T) mostly occurs in the gasket elements. FIG. 12(b) shows the magnetic flux vector. As expected, the gasket 14 region where the saturation occurs experiences a concentrated vector field. This also indicates that most of the force happened in this region.

Figure 13A:
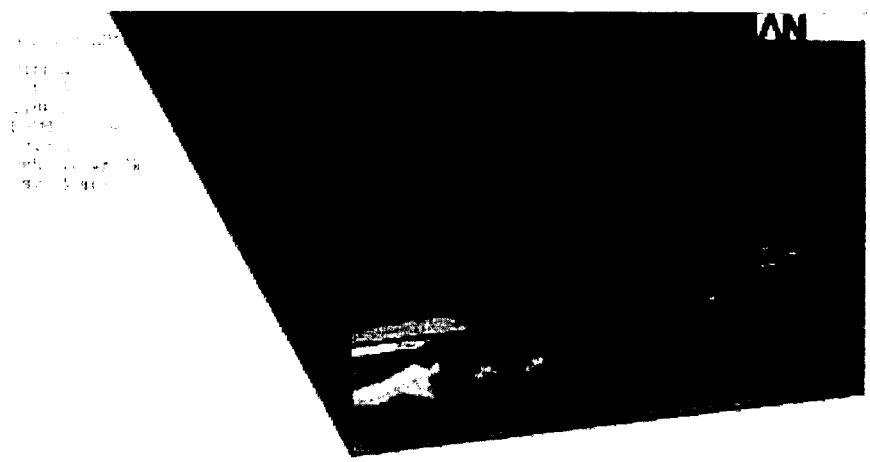
FIG. 13 is a the magnetic results of the third model developed in ANSYS 5.7 for a particular geometry with Orthonol.
Figure 13B:
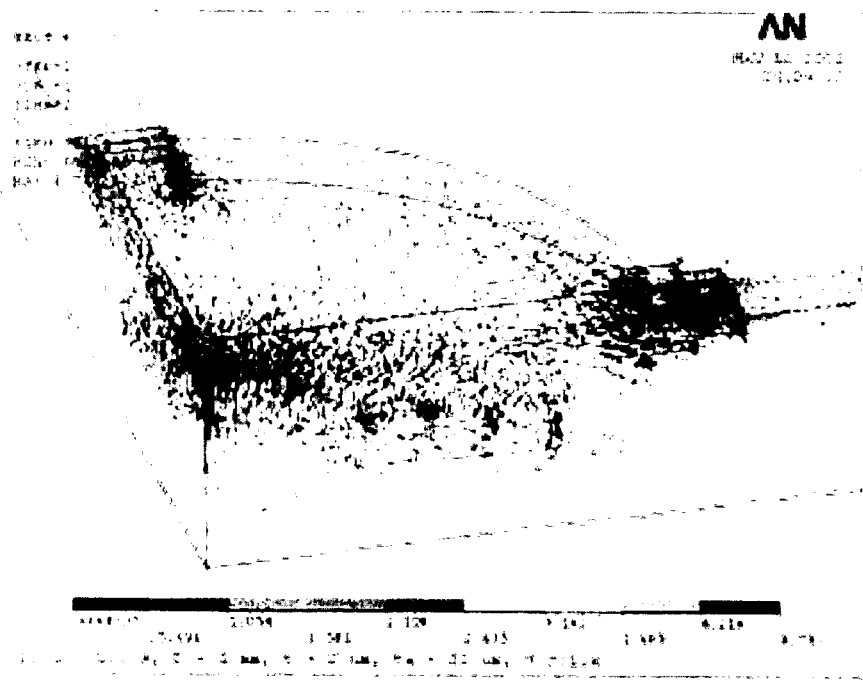
Figure 14A:
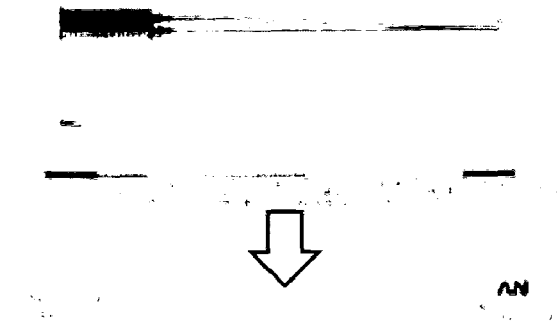
FIG. 14 is a structural results of the FEA using ANSYS 5.7 is a showing the membrane displacement at different iterations.
Figure 14B:
Figure 14C:
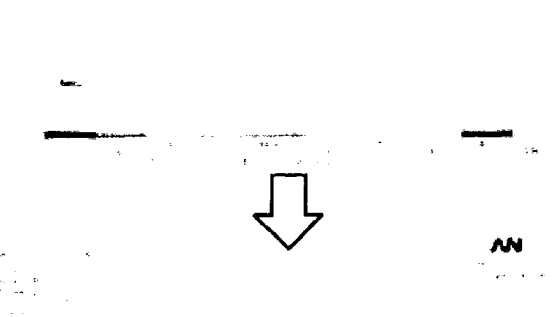
Figure 14D:
Figure 15A:
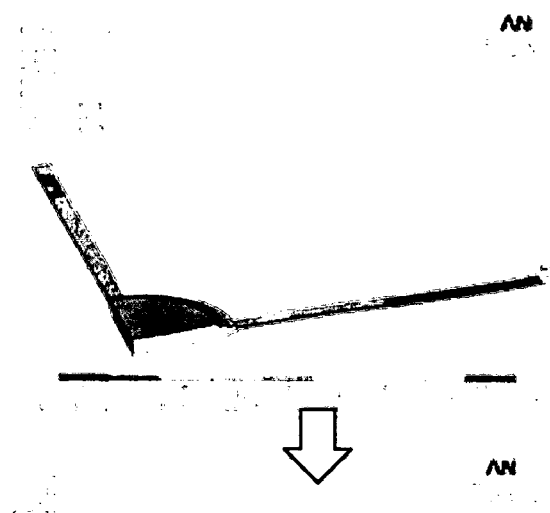
FIG. 15 is a structural results of the FEA using ANSYS 5.7 is a showing the membrane lateral stress at different iterations.
Figure 15B:
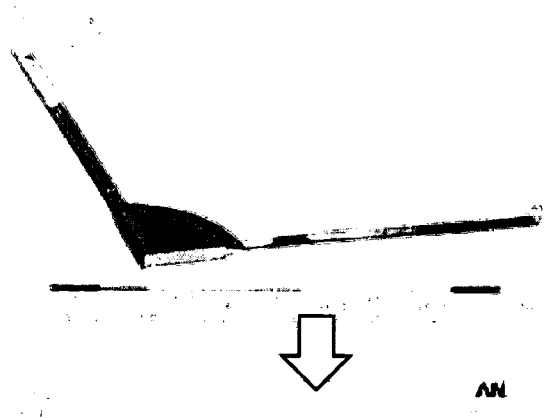
Figure 15C:
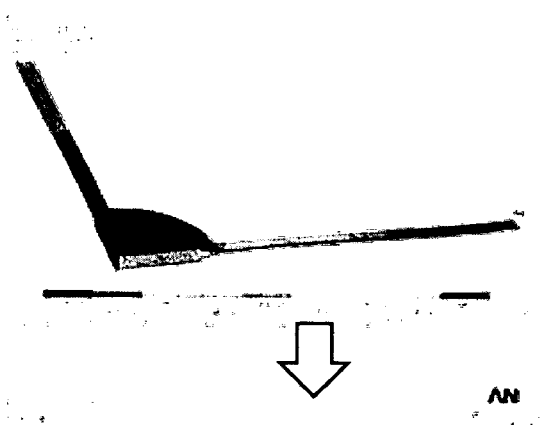
Figure 15D:
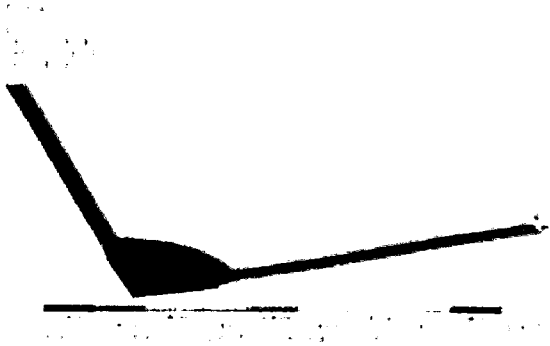

FIG. 13 show the magnetic reults for five (5) coils 42 with four (4) turns of Orthonol inserted in between the coils 42. For this particular embodiemnt, a current of 1 A was required in order for the mebrane to fully deflect. In comparison to FIG. 12, FIG. 13 interestingly show that the saturation is occuring less in the stucture, even tough a much higher current is applied. FIG. 13(b) shows that the magnetic field vector is no longer concentrated in the gasket 14 area, but is more distributed through the Orthonol in between the coils 42. This shows one advantages in inserting Orthonol in between the coils 42.

FIG. 14 show the structural results of the ANSYS 5.7 analysis, for the model with a buckled membrane 30. The membrane 30 is initially buckled upward with a distance of 15 μm from the horizontal position. A current is drawn in the coils 42 until it finally deflects the membrane 30. The structural analysis shows the displacement results (μm) of the membrane 30 at different iterations. FIG. 14 show the displacement results of the membrane 30 at four (4) different iterations. Forty-three (43) iterations were required for the analysis to fully deflect the membrane 30 until it touched the gasket 14.

FIG. 15 show the lateral stress (SX, Pa), experienced by the membrane 30 at different iterations. As shown in the FIGS., most of the stress is experienced by the element on the support. A combination of tensile and compression stresses were experienced by the centered dome 32 as it came to instability, the point where dome loss its stiffness. These are shown in the iteration numbers 41 and 42. Once the instability was done, the centered dome 32 came into its stable position with compression stress.

Table 3 shows a summary of different magnetic and structural results of the ANSYS couple field model. The results are for a flat membrane 30 at different gap distances and current flows.

TABLE 3

| # coils | A SD Cur | µN Mag Force | T Bmax | Loc | µN Fz | MPa SX (disk) | MPa SX (Cant) | Pa SM (disk) | MPa SM (Cant) |
|---|---|---|---|---|---|---|---|---|---|
| 12 µm (gap) | | | | | | | | | |
| 7 turns | 0.5 A | 320.5 | 1.471 | gasket | 365 | −59.1 | 23.5-106 | 282,727 | 99.4 |
| 8 turns | 0.4 A | 503.5 | 1.619 | gasket | 423 | −62.3 | 39.4-141 | 402,245 | 122 |
| 15 µm (gap) | | | | | | | | | |
| 8 turns | 0.6 A | 438 | 1.601 | gasket | 450 | −23.9 | 0-102 | 382,667 | 127 |
| 9 turns | 0.6 A | 581.82 | 1.565 | gasket | 472 | −21.7 | 0-112 | 424,881 | 135 |
| 17 µm (gap) | | | | | | | | | |
| 8 turns | 0.8 A | 833 | 1.919 | gasket | 723 | −16.5 | 0-133 | 571,040 | 165 |
| 12 µm (gap) | | | | | | | | | |
| 5 Cu + 4 ORT | 1 | 410 | 1.468 | Gas + cant | 249 | −81.7 | 0-84.7 | 262,645 | 88 |
| 5 Cu | 1 | 301.6 | 1.465 | Gas + cant | 346 | −57.9 | 0-96.1 | 264,543 | 92.7 |
| 15 µm | | | | | | | | | |
| 5 Cu + 4 ORT | 0.9 A | 1199.8 | 1.712 | gasket | 644 | −48.7 | 0-94.2 | 561,702 | 143 |

Table 3 shows that for a membrane 30 with a gap of 12 µm and five (5) turns of coil, it will produce a downward force of 301.6 µN to fully deflect the membrane 30. However, the addition of four (4) turns of Orthonol in the coils 42 increases the magnetic force to 410 µN, which is about a 33% increase from the case without Orthonol insertion. The 3D analysis supports the results from the 2D results, where the insertion of Orthonol in between the coils 42 has significantly increased the electromagnetic force.

The present microvalve 10 further includes another unique feature, an integrated switching mechanism. Most conventional commercialized valves have required an additional pressure sensor to detect whether the valve 10 is fully opened or closed. Yet, the additional pressure sensor in a MEMS structure would introduce additional costs and complexity. The present design provides an integrated switching mechanism to replace the additional pressure sensor.

Figure 16:
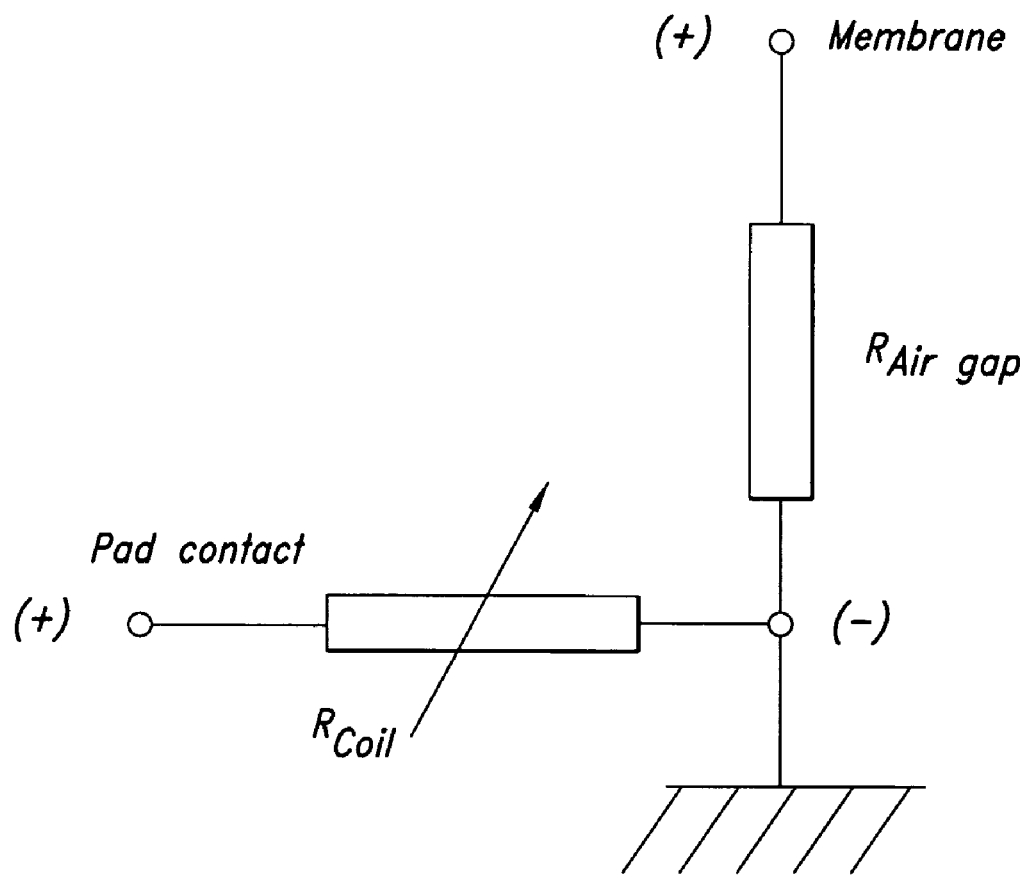
FIG. 16 is an integrated switching mechanism according to one embodiment of the present invention.
Figure 17A:
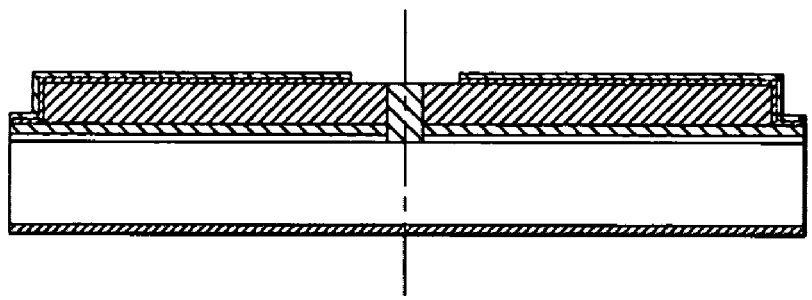
FIG. 17 is a fabrication process of the microvalve according to one embodiment of the present invention.
Figure 17B:
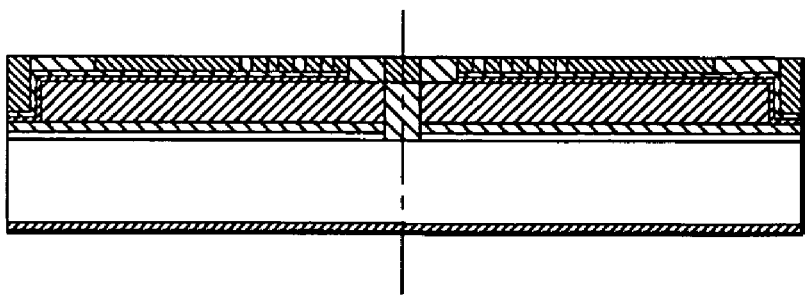
Figure 17C:
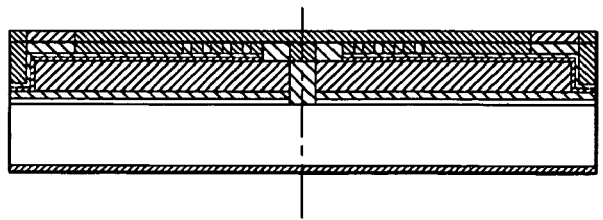
Figure 17D:
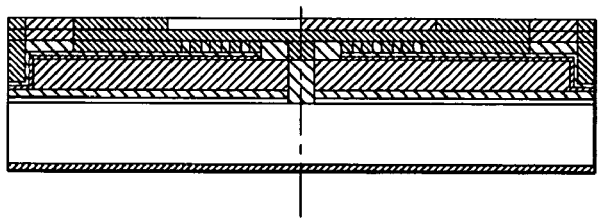
Figure 17E:
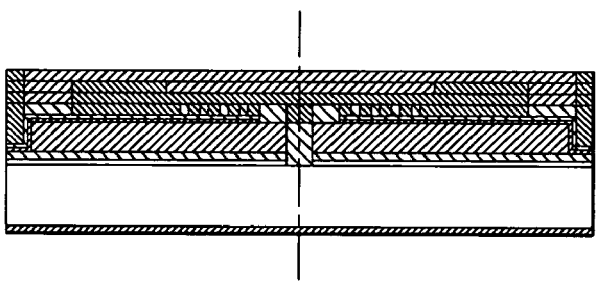
Figure 17F:
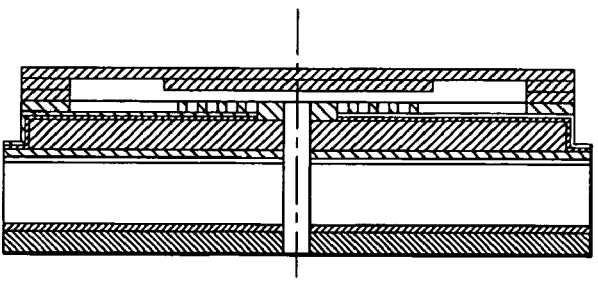

As shown in the FIG. 16, under normally opened conditions, there is no signal for the current flowing through $R_{air\ gap}$, as its value is infinity. However, when the valve 10 closes, the membrane 30 touches the gasket 14 at the center of the coil 42. The gasket 14 is connected to the negative ground. This provides a signal, and a useful diagnostic to determine whether the valve 10 is currently closed or opened, without providing an additional pressure sensor to detect presence of flow.

The fabrication process of the present microvalve 10 is understandably challenging, as it preferably is CMOS compatible, and preferably fabricated fully on a single wafer 160. One of the restrictions raised for CMOS compatibility is the fabrication temperature, which is has to be less than 300° C. in order not to damage the IC circuit. For this condition to apply, the SiO$_2$ deposition for the insulation layer has to be done by using PECVD at a low temperature, for example, at 300° C. Electroplating has been chosen to build the valve structure for its relatively low temperature processing. For example, the electroplating of Orthonol (50% Ni and 50% Fe) is done at a temperature range of between 55-60° C.

Another challenge was to fabricate the valve 10 structure on a single wafer 160. Under this condition, the inlet liquid orifice has to be made on the same wafer 160 as the structure. Most of the current microvalves are etched a single wafer/substrate to create the inlet hole. Then clamps are used to clamp it with another wafer/substrate where the structure is built. The fabricated of these two wafers are done separately. Such a process involves a wafer bonding that is undesirable for CMOS compatibility.

In the present invention, the fabrication process is done entirely of a single wafer 160. After fabricating the valve structure on top of the wafer 160, the back of the wafer 160 is etched through by using a deep RIE (ICP) process which takes about 12-14 hours for a wafer thickness of 500-550 µm. This reduces the possibility that the wafer 160 may get fragile in the process if the etching is done at the start or in the middle of the process.

The present fabrication process comprises three steps of electroplating, DC sputter, thermally grown SiO$_2$, PECVD SiO$_2$, RIE, and deep RIE (ICP). The details of the fabrication process are shown in FIG. 17. First, the step of thermally growing SiO$_2$ on the wafer 160 at a temperature of approximately 1100° C., for approximately three (3) hours, is run, and grows approximately 0.5 µm of SiO$_2$. On the top side of the wafer 160, DC sputtered Ti/Cu/Ti at the thickness of 500 A, 3000 A, 500 A, respectively, is completed.

Photolithography number 1 creates the mold for electroplating the base of the valve 10. Electroplating of NiFe (50% Ni, 50% Fe) is done by pulsed plating at J=30 mA/cm$^2$, bias of −10%, and duty ratio of 40%. The thickness is 15 µm is produced.

After removing the photoresist, photolithography number 2 creates the mould to fill up the inlet hole in the base center with electroplated sacrificial Cu, plating at direct current of 10 mA/cm$^2$. PECVD 0.8 µm of SiO$_2$ at a temperature of approximately 300° C. creates an insulation layer between the base and the coil. Photolithography number 3 creates the contact window for etching the SiO$_2$ insulating layer. The etching of the SiO$_2$ is preferably done by RIE.

Photolithography number 4 creates the mould for coil 42 electroplating. The gold electroplating is done by a direct current at the J=5 mA/cm in a cyanide based solution. The thickness of the electroplated gold is 10 μm. Photolithography number 5 creates the mould of valve's circular support. The support is made from electroplated NiFe by pulsed current electroplating at the J=30 mA/cm$^2$, bias of −10%, and the duty ratio of 40%. The thickness of the electroplated NiFe defined the gaps movement of the valve 10; it is in about 12 μm Photolithography number 6 creates the mould of centered dome 32 of the membrane 30. It is made from electroplated NiFe by pulsed current electroplating at the J=30 mA/cm$^2$, bias of −10%, and the duty ratio of 40%. The thickness of the electroplated NiFe is about 8 μm.

Photolithography number 7 creates the mould of the membrane 30. It is made from electroplated NiFe by pulsed current electroplating at the J=30 mA/cm$^2$, bias of −10%, and the duty ratio of 40%. The thickness of the electroplated NiFe is about 3 μm. This defines the thickness of the cantilever legs 34.

The next step is to do back side photolithography. This is for mask number 8 that defines the etching pattern for the inlet hole. Once the backside photolithography has been completed, the SiO$_2$ on the windows is etched first by ICP for 15 minutes. And then the Si is etched though the wafer 160 by ICP for 12-14 hours, the etched is stopped on the SiO$_2$ that was previously thermally grown. The SiO$_2$ is then etched by sing RIE. The sacrificial copper is etched by solution, NH$_4$OH+CuSO$_4$.5H$_2$O saturated. The photoresist is stripped and the Ti/Cu seed is also etched. The release membrane 30 is defined, and the last step is to attach the permanent magnet 54 on the back of the wafer 160.

Another fabrication method for the microvalve includes implementing the permanent magnet as a part of the whole entire fabrication process. The fabrication process comprises four steps of electroplating, DC sputter, thermally grown SiO$_2$, PECVD SiO$_2$, RIE, and deep RIE (ICP). The details of the fabrication process are shown in FIG.S. 38. First, the step of thermally growing SiO$_2$ on the wafer 160 at a temperature of approximately 1100° C., for approximately three (3) hours, is run, and grows approximately 0.5 μm of SiO$_2$. On the top side of the wafer 160, DC sputtered Ti/Cu/Ti at the thickness of 500 A, 3000 A, 500 A, respectively, is completed.

Photolithography number 1 creates the mold for electroplating the base of the valve 10. Electroplating of NiFe (50% Ni, 50% Fe) is done by pulsed plating at J=30 mA/cm$^2$, bias of −10%, and duty ratio of 40%. The thickness is 15 μm is produced.

After removing the photoresist, photolithography number 2 creates the mould to fill up the inlet hole in the base center with electroplated sacrificial Cu, plating at direct current of 10 mA/cm$^2$. PECVD 0.8 μm of SiO$_2$ at a temperature of approximately 300° C. creates an insulation layer between the base and the coil. Photolithography number 3 creates the contact window for etching the SiO$_2$ insulating layer. The etching of the SiO$_2$ is preferably done by RIE.

Photolithography number 4 creates the mould for coil 42 electroplating. The gold electroplating is done by a direct current at the J=5 mA/cm$^2$ in a cyanide based solution. The thickness of the electroplated gold is 10 μm. Photolithography number 5 creates the mould of valve's circular support. The support is made from electroplated NiFe by pulsed current electroplating at the J=30 mA/cm$^2$, bias of −10%, and the duty ratio of 40%. The thickness of the electroplated NiFe defined the gaps movement of the valve 10; it is in about 12 μm Photolithography number 6 creates the mould of permanent magnet that is a part of the center dome. But firstly the side wall is NiFe electroplated. The thickness of the photoresist is 100 μm. The electroplated NiFe by pulsed current electroplating at the J=30 mA/cm$^2$, bias of −10%, and the duty ratio of 40%. Still on the same photoresist, the second photolithography is carried on (namely Photolithography number 7). It creates the mould of permanent magnet as the center dome. The electroplated permanent magnet which is a CoNiMnP alloy by direct current electroplating at the J=10 mA/cm$^2$.

Photolithography number 8 creates the mould of centered dome 32 of the membrane 30. It is made from electroplated NiFe by pulsed current electroplating at the J=30 mA/cm$^2$, bias of −10%, and the duty ratio of 40%. The thickness of the electroplated NiFe is about 8 μm.

Photolithography number 9 creates the mould of the membrane 30. It is made from electroplated NiFe by pulsed current electroplating at the J=30 mA/cm$^2$, bias of −10%, and the duty ratio of 40%. The thickness of the electroplated NiFe is about 3 μm. This defines the thickness of the cantilever legs 34.

The next step is to do back side photolithography. This is for mask number 8 that defines the etching pattern for the inlet hole. Once the backside photolithography has been completed, the SiO$_2$ on the windows is etched first by ICP for 15 minutes. And then the Si is etched though the wafer 160 by ICP for 12-14 hours, the etched is stopped on the SiO$_2$ that was previously thermally grown. The SiO$_2$ is then etched by sing RIE. The sacrificial copper is etched by solution, NH$_4$OH+CuSO$_4$.5H$_2$O saturated. The photoresist is stripped and the Ti/Cu seed is also etched. The release membrane 30 is defined.

Figure 18:
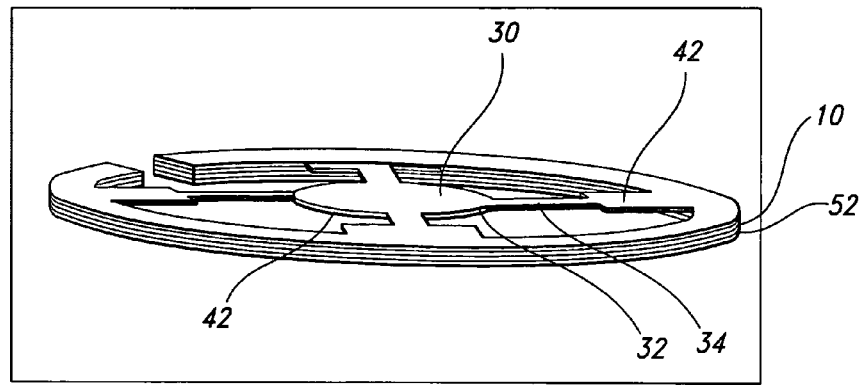
FIG. 18 is a close up picture of a microvalve with folded support according to one embodiment of the present invention.
Figure 19:
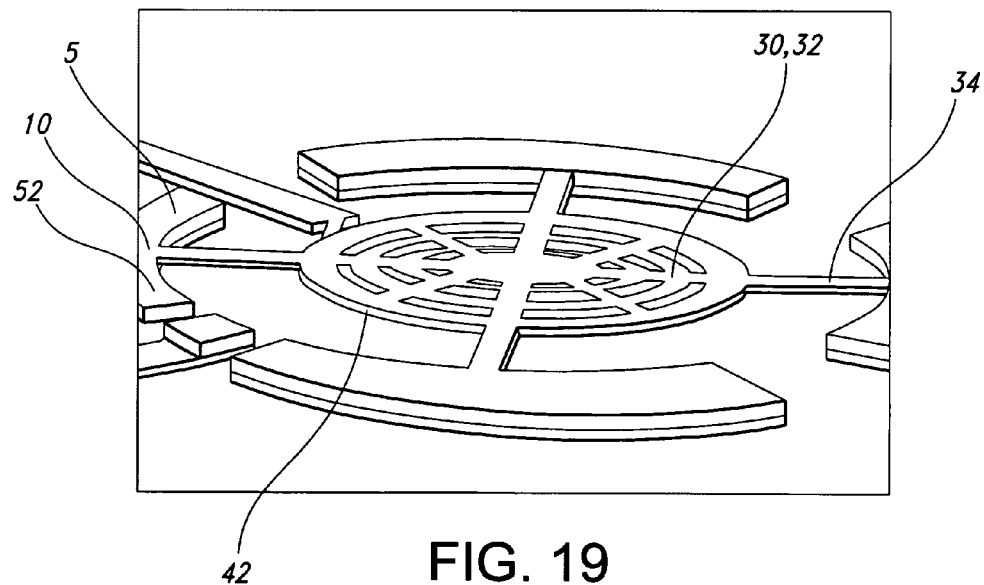
FIG. 19 is a close up picture of a microvalve with hole through the wafer according to one embodiment of the present invention.

FIGS. 18 and 19 show SEM pictures of the valves 10 that have been fabricated in this research. There are shown two types of valves 10 that have been fabricated, the first and the second generations. The first generation microvalve is shown in FIG. 18, which valve 10 is basically an actuator. It was fabricated to define the structure of the membrane 30 and coils 42, and to see the feasibility of having the whole valve structure, including the membrane 30, to be built on top of a single wafer 160. There is no inlet hole developed in the first valve generation.

The fabrication process of the valve 10 of FIG. 18 is basically similar to the processes shown in FIGS. 17(a-e). As shown in FIG. 18, the overall size of the valve 10 is 1000 μm. This includes a membrane 30 with a centered dome 32 of 300 μm and 10 μm (H)×8 μm (W) coils 42. The distance between the coil 42 and the dome 32 is 12 μm. There are two types of cantilever supports that are built for the membrane 30, a flat support and a double folded support (as shown in FIG. 18). The folded support is developed to overcome the possible tension stress occurring during the membrane 30 electroplating.

The valve structure has two electrical connections for the coil, the positive and negative connections. The negative connection is basically connected to the base of the valve 10 with SiO$_2$ as the insulation layer. In the first generation of microvalve, several fabrication issues were experienced, including the difficulty to etch the coil seed layer. As shown FIG. 18, there is only a 15 μm gap available for the etchant to etch the seed layer in between the coil. This produced a significant difficulty in etching, and longer time in the etchant solution (NH$_4$OH with CuSO$_4$.5H$_2$O (Saturated)) may give over etch which lift off the coil.

FIG. 19 shows the complete valve structure of the second generation of the present microvalve 10. In this valve 10, the membrane 30 was provided with a corrugated hole, introduced to the system in order to facilitate the flow of etchant for etching the seed layer in between the coils 42. The second generation of microvalve 10 includes the inlet hole for liquid flows; this has been done by etching through the back of the wafer 160 by Bosch process in ICP machine for 12-14 hours. The close up picture of the hole, when the membrane 30 is lifted off, is shown in the FIG. 20.

FIGS. 17(a-e) show the detail of the fabrication process of this second generation of microvalve 10. There are three different overall sizes of the microvalve 10 that have been fabricated: 1000 µm, 1500 µm, and 2000 µm. FIG. 19 shows the valve 10 with the overall sizes of 1000 µm. It shows that the centered dome 32, with the diameter of 500 µm, has a corrugated hole with the size of 20 µm. Its center is solid, with the diameter of 180 µm. Further, an inlet orifice with the diameter of 60 µm is located beneath this membrane 30.

There are preferably four types of membranes 30 that have been designed: two legs membrane separated by 90°, two legs membrane separated by 180°, three legs 34 separated by 120°, and four legs 34 separated by 90°. Additionally, there are three different legs 34 supports are designed for the membrane 30: flat support, double folded support, serial support. FIG. 21 illustrates an array of valves with flat support, showing clearly the two legs membrane separated by 180° and three legs 34 separated by 120°. FIG. 18 shows the picture for double folded support.

Table 4 shows the coil 42 resistance measurement for particular valve geometry. A comparison between theory and experimental values are shown. It shows that there is a difference of a factor of two between the experimental results and the theoretical values.

TABLE 4

SUMMARY FOR COIL-8 MICRON

| No of turns | THEORY | MEASUREMENT |
| --- | --- | --- |
| 5 | 3.00 | 6.4 |
| 6 | 4.04 | 7.8 |
| 7 | 5.16 | 10.5 |
| 4 | 3.09 | 6.4 |
| 4 | 3.77 | 8.4 |
| 5 | 4.86 | 10.4 |

FIG. 22 shows the stiffness of the present microvalve 10 measured with a "Tribo-indenter", which senses the movement of the membrane 30 by a capacitive approach. The tip of the sensor used for the measurement was a 200 µm-sphere. During the testing, the tip-sensor touches the membrane 30 surface, and applies a displacement to the membrane 30, while at the same time sensing the experienced reaction force. The instrument gives a lot of data which are then complied into a program to plot a graph.

In this experiment, the membrane 30 was suspended from the coils 42 by the distance of 12 µm. The overall size of the valve 10 was 1000 µm with a 300 µm centered dome 32. The microvalve 10 tested is shown in FIG. 18.

It shows that the membrane 30 stiffness is not entirely linearly dependent on the displacement. It shows a linear dependency at low displacement, less than 2 µm. Above 3 µm, the force shows a significant non-linear behavior. More force is required for valve 10 deflection after 8 m defection. FIG. shows that in order to fully deflect the membrane 30 at the distance of 12 µm, the required external force must be at least 780 µN.

The ANSYS 5.7 simulation results for the magnetic analysis, as shown in Table 3, shows that for a valve 10 with 12 µm and 8 coil turns, at the current of 0.4 A, the total magnetic force is 503.5 µN, which is less than 780 µN. Experiments show that the membrane 30 did not show significant movement at the current of 0.4 A, but it fully deflected at the current of 0.8 A. This illustrates that the ANSYS 5.7 simulation provides a good prediction in the electromagnetic force.

Table 5 shows an experimental data for membrane 30 actuation in a free air. The testing was done on a valve 10 with the overall size of 1.5 mm, having a membrane 30 with 60 µm width flat legs 34 and the maximum membrane 30 displacement was 12 µm. The signal was generated by potential step.

TABLE 5

| Frequency Hz | Act Time ms | Current I | Voltage V | Energy mJ |
| --- | --- | --- | --- | --- |
| 5* | 50 | 0.66 | 2.00 | 66.00 |
| 20 | 25 | 0.60 | 1.67 | 24.78 |
| 50 | 10 | 0.65 | 1.83 | 11.98 |
| 100 | 5 | 0.71 | 1.97 | 6.96 |

Figure 23:
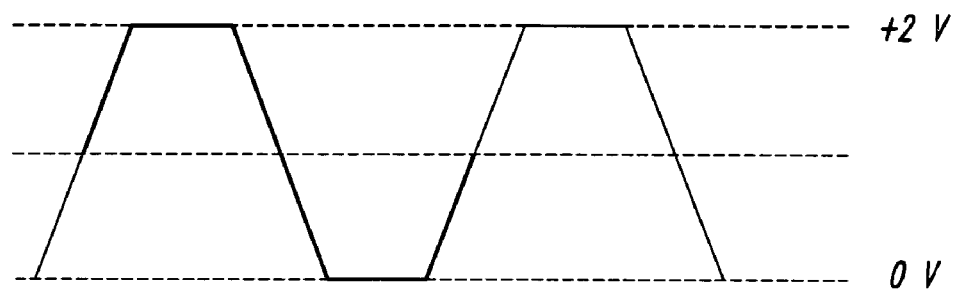
FIG. 23 is the shape of voltage signal generated by the potential step.

In essence, the restriction is a result from the squeeze film damping of the compressible air volume beneath the membrane 30. The test was done at the coil resistance of about 3 ohm. The testing was done by two different instruments. The first test was done by using potential step, which basically delivers a voltage input to the coils 42 at different shape. The signal shape at different duty ratios and biases can be inputted from the device. The first row of data shown in the Table 5 is generated at the frequency of 5 Hz, the total time of one frequency is 0.2 s, but the effective actuation time for the signal is 50 ms (refer to FIG. 23 for more detail).

The other data were taken by using the STANFORD signal generator that is connected to an amplifier. The tests were done at different frequencies and it showed the energy required for actuation. Table 5 shows that the valve 10 has the capability to fully actuate at the time of 5 ms. Under this condition, the energy requires is 6.96 mJ. The fatigue test of the valve 10 membrane 30 at the frequency of 5 Hz, by using potential step, shows that it still survives after 300,000 cycles of actuation. This shows that the valve 10 has a good operational life time.

Figure 24A:
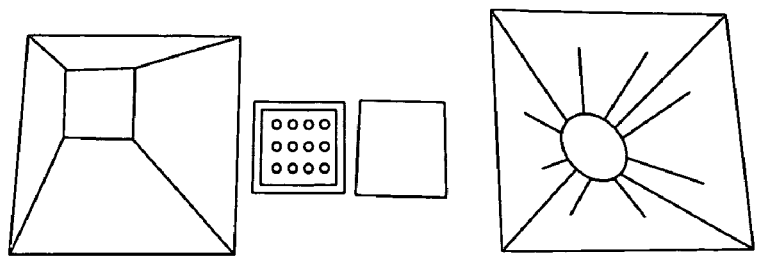
FIG. 24 is the parts for the whole microvalve system and completed structure of the microvalves feasible for fluidic mixer all according to one embodiment of the present invention.

FIG. 24(a) shows the parts of the present invention that have been built by stereo lithography for microvalve 10 testing. Shown is a 12 mm×12 mm chip, which has 12 microvalves 10 built on top of the wafer 160. The sealing in the microvalve 10 structure has been accomplished by introducing PDMS flow channel 20 structure, molded in stereo lithography housing. As shown, there are two PDMS filled fluidic channels 20. The fluidic channels 20 and housing dimensions are defined by the microvalve 10 micro-machining structure.

Figure 24B:
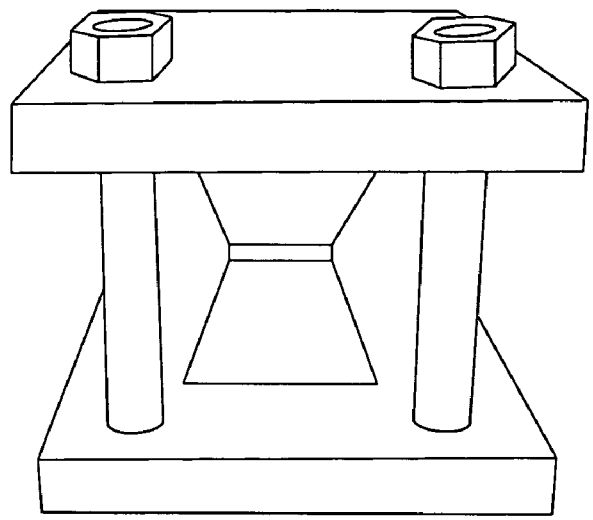
Figure 24C:
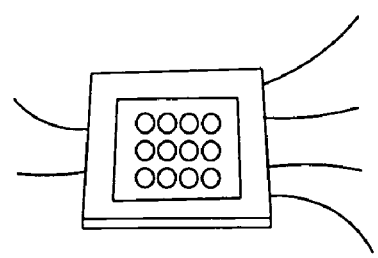

FIG. 24(b) shows the assembly of the parts as shown in FIG. 24(a). A compressive fitting is applied by a bolt and nut. FIG. 24(b) basically shows the testing set up of the valve 10. FIG. 24(c) shows a wire bonding packaging for the microvalve 10. There are twenty-six (26) wires that have been bonded for the operation of twelve (12) microvalves 10. A machining job was done on the package, in order to have access to the inlet hole on the back of the wafer 160. Hoses, preferably soft silicone hoses, are connected to the top fluidic channel 20 to deliver fluid to the inlet orifice of the valve structure. Further, silicone hoses can connect to the outlet channels 20.

The miniaturization, flexibility, and low power consumption of the microvalves 10 built in this project, open the opportunity to develop a micro-mixer with the implementation of PDMS structures for the fluidic channels 20.

Figure 25:
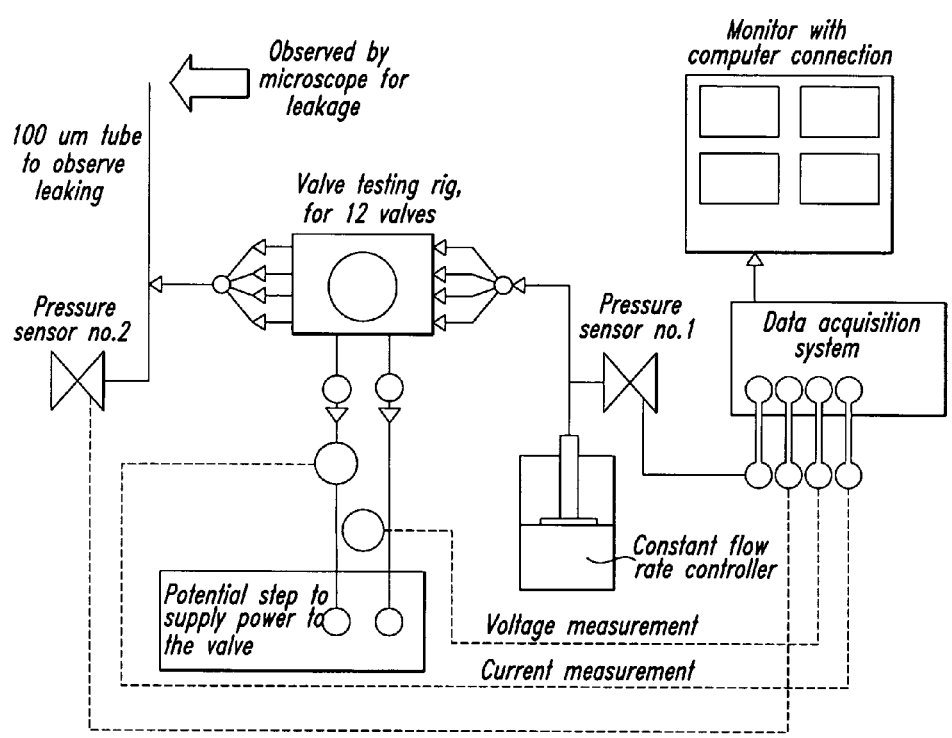
FIG. 25 is a schematic of the instruments setup for data collection in a microvalve test.

The valve 10 testing setup as shown in FIG. 24(b) was for fluidic testing, where a mixture of 50% water and 50% methanol by volume was used for the working fluid. The schematic for the testing setup, together with the instruments connections, are shown in FIG. 25. As shown, the voltage is supplied from the potential step to the valve 10 for closing the membrane 30. The valve 10 voltage and current are measured and inputted to the data acquition system. Pressure sensor 1 is connected to the valve inlet to measure the differential pressure required to flow through the valve 10.

A pressure sensor is connected to the valve outlet. A 100 μm tube is connected to the valve outlet together with the pressure sensor, to examine the possible leaking when the valve 10 is closed. The leaking is observed under the microcope. Twelve (12) valves 10 are tested on a single chip package as shown in FIG. 24(c).

Figure 26:
FIG. 26 is a picture of the instrument setup for valve testing.
Figure 27:
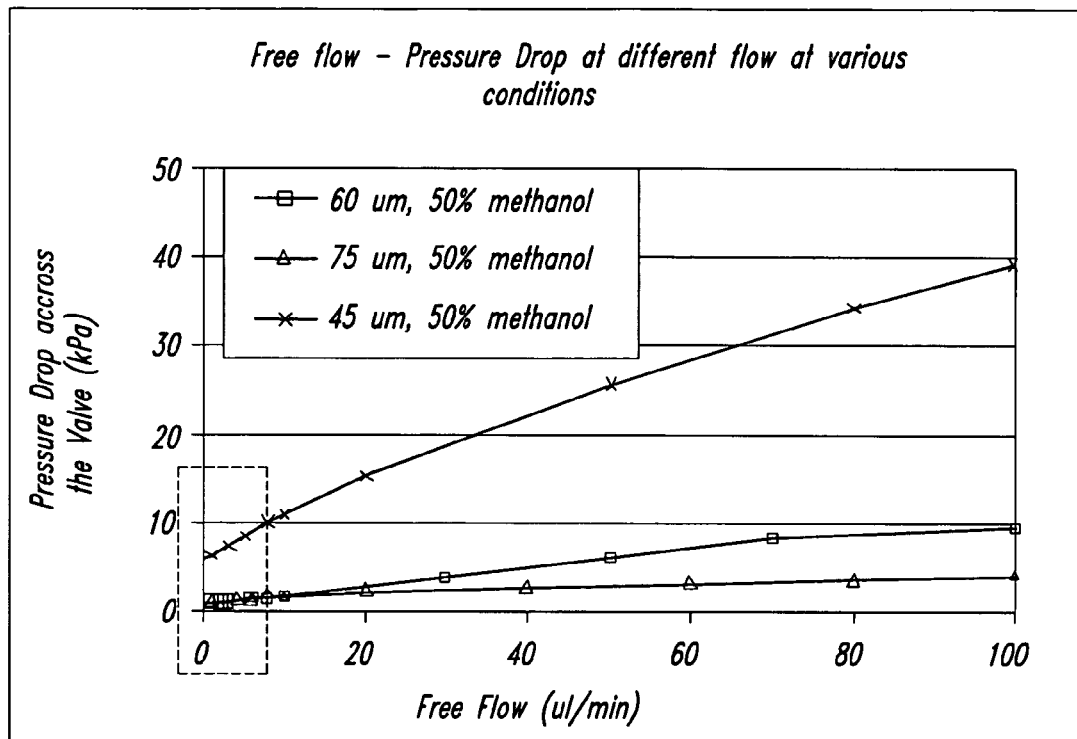
FIG. 27 is a pressure drop across the valve at different size of the inlet holes under free flow condition.

FIG. 26 illustrates the picture of the instrument setup for microvalve 10 tests. It shows the pressure sensors, the microvalve testing rig, the flow controller, the 100 μm clear tube, and the microscope. FIG. 27 shows the pressure drop across the valve 10 at different size of the inlet diameter under free flow condition, which means that the valve membrane 30 is fully open.

The test shows a linear relationship in the pressure drop at low volume flow rate (<40 μl/min). FIG. 27 shows that the slope of pressure drop decreases as the volume increases. It is suspected that there is a start of minor leakage in the testing rig setup, which is unobserved by eyes. The complete valve testing rig structure has shown a significant leakage at the pressure of 57 kPa.

As hereinbefore before, a preferred application of the present microvalve 10 is in order to turn on and turn off the pressurized chamber of a fuel cell. The operating condition of the fuel cell requires the flow rate of 0.08 μl/min (diluted methanol in water) in order to produce power of 10 mW. The smallest flow rate that is tested by using the flow controller is 1 μl/min (50% water and 50% methanol by volume). For 1 μl/min, the pressure drop is about 600 Pa for the inlet diameter of 60 μm. By interpolation, for the flow rate of 0.08 μl/min, the pressure drop is 48 Pa, which is negligible compare to the expected pressure drop in the fuel cell micro-channels of about 10,000 Pa. The present valve 10 operation has shown that the pressure drop is insignificant for the fuel cell application.

Figure 28:
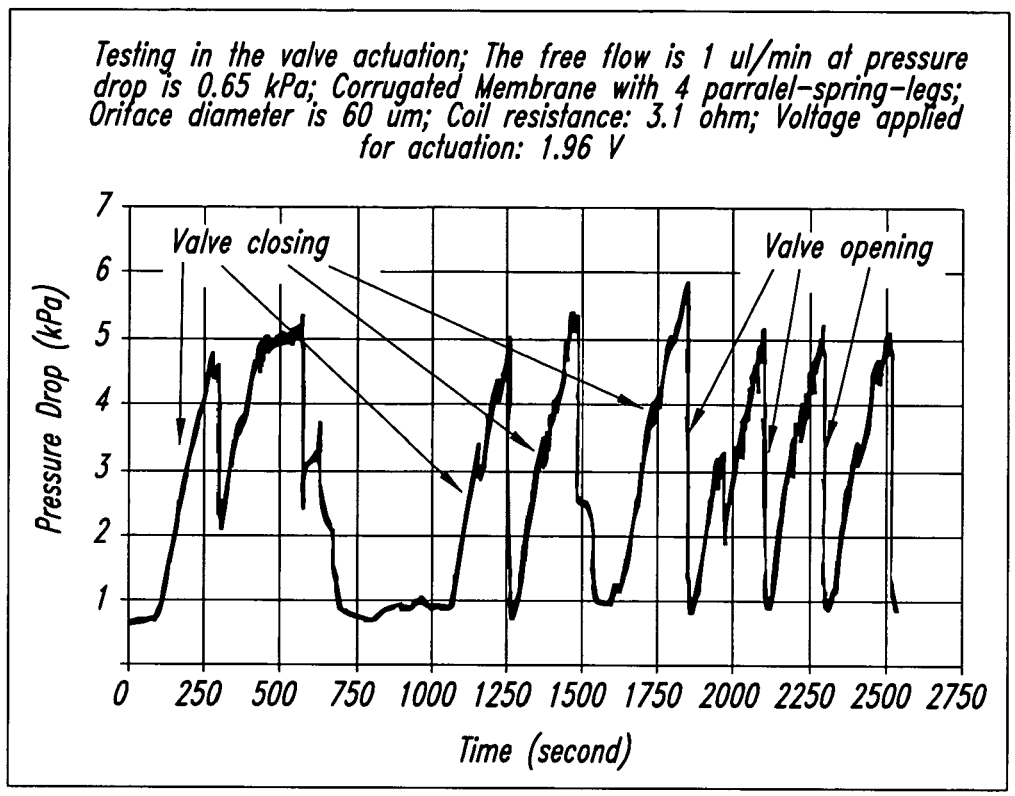
FIG. 28 is a valve fluidic testing for opening and closing conditions.

After measuring the pressure drop across the valve 10 under free flow condition, the next task was to measure the pressure across the valve 10 when it closes. FIG. 28 shows the testing results of the present microvalve 10 for opening and closing a fluidic flow of 1 μl/min (50% methanol and 50% water).

The test is run for the valve 10 with the overall size of 1,500 μm that had a corrugated membrane 30 with four (4) legs-parallel folded support. The orifice diameter was 60 μm with the coil resistance of 3.1 ohm. Under fully open condition, the pressure drop across the whole experimental setup was about 600 Pa.

FIG. 28 shows that the valve 10 is able to latch the membrane 30 and restrict the fluid flow until the pressure drop across the valve 10 increase up to 6 kPa. The valve 10 starts to leak once the pressure goes beyond this value; this is shown by the decrease of the valve 10 pressure. The voltage applied to the coil 42 is 1.96 V, which correspond to the current of (1.96 V/(3.1+3.6) ohm)=0.2925 A. The 3.6 ohm resistance is the dummy resistor that is used in the circuit to measure the current.

It shows that it takes about 200 s in order to detect the pressure drop to increase to 5 kPa. This is mostly due to the slow response time of the pressure sensor to detect the change in pressure for such as very small flow rate (<1 μl/min). The pressure sensor has a silicon membrane sensor, and senses the change is the capacitance as the membrane 30 moves due to the increase in pressure. The cavity of the membrane 30 has to be filled up and pressurized with the fluid in order for the membrane 30 to sense the fluidic pressure.

Since the fluidic flow is very small, it takes quite some times for the cavity to be filled. The opening time of the valve 10 is very fast, and shows that the time is really insignificant for the pressure to drop from 5 kPa to 0 kPa.

The capability of the valve 10 to restrict the flow only up to 5 kPa is suspected due to the generated bubble on the coil 42 due to electrolysis behavior. Since the coil 42 in this embodiment is made gold, and the fluid is 50% water, there is hydrolysis behavior occurring on the coil surface that generates bubbles. The bubbles hinder the membrane 30 to be fully latched. One way to minimize this behavior is to coat the coils 42 with a dielectric material.

Dielectric coating of the coil 42 can be carried out in vapor phase or in liquid phase. The coating process should produce a thin adherent layer that provides electrical insulation to the fluid. In the preferred embodiment dielectric coating includes coating Parylene on the valves structure after the fabrication, as shown in FIG. 17, is completed. Parylene was deposited on top of the structure to a thickness of 0.5-1 μm. The deposition was done at room temperature by vapor phase. The functions of Parylene were: to protect the valve structure from corrosion since it is made from metal (NiFe), to act as a gasket 14 to provide sealing between the membrane 30 and the inlet hole, and to minimize the bubble production from the electrolysis behavior on the coil 42 surface.

Figure 29:
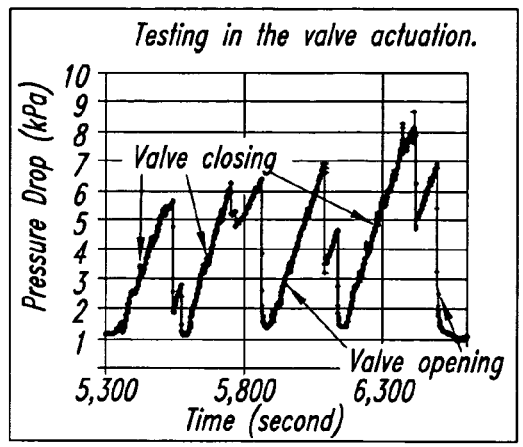
FIG. 29 is a testing of opening and closing of the valve is a without Parylene coating.
Figure 30:
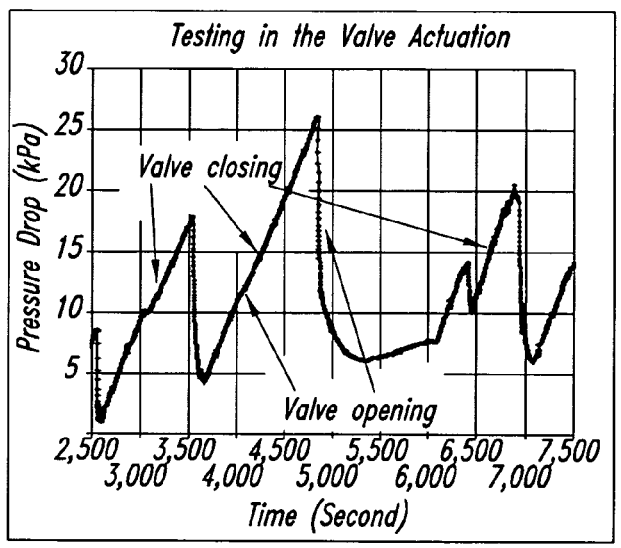
FIG. 30 is a testing of opening and closing of the valve is a with Parylene coating.

The Parylene deposition has shown a significant improvement of the valve 10 performance to close the fluidic flow. FIG. 29 shows the valve 10 performance without a Parylene coating, the closing of the valve membrane 30 bringing the pressure to increase to 7 kPa—beyond this pressure some leaks happen from the membrane 30. The additional Parylene coating on the structure increased valve-sealing, as shown in FIG. 30, where the flow is basically choked and pressure went up to 30 kPa. Under this condition, the leaking of the valve 10 was almost zero.

Figure 31:
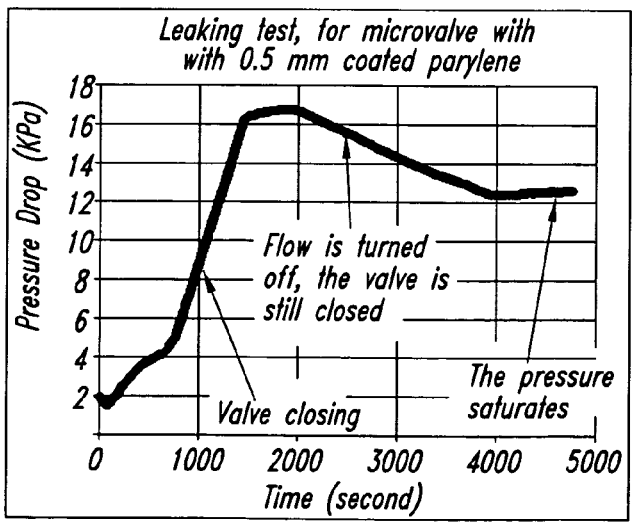
FIG. 31 is the leaking test of the microvalve with 0.5 μm coated Parylene.

A leaking test was also done for the valve 10 with Parylene coating, which showed positive results. As shown in FIG. 31, a test was run to bring the valve 10 to the closed position, and the pressure increased to 17 kPa, and then the flow was turned off, and the pressure maintained at 17 kPa for a short time (400 s), and then slowly decreased to the pressure of 12 kPa after 2000 seconds (about 3.5 hours), and then maintained at this pressure. This shows that the valve 10 has good sealing properties and almost zero leak.

Figure 32:
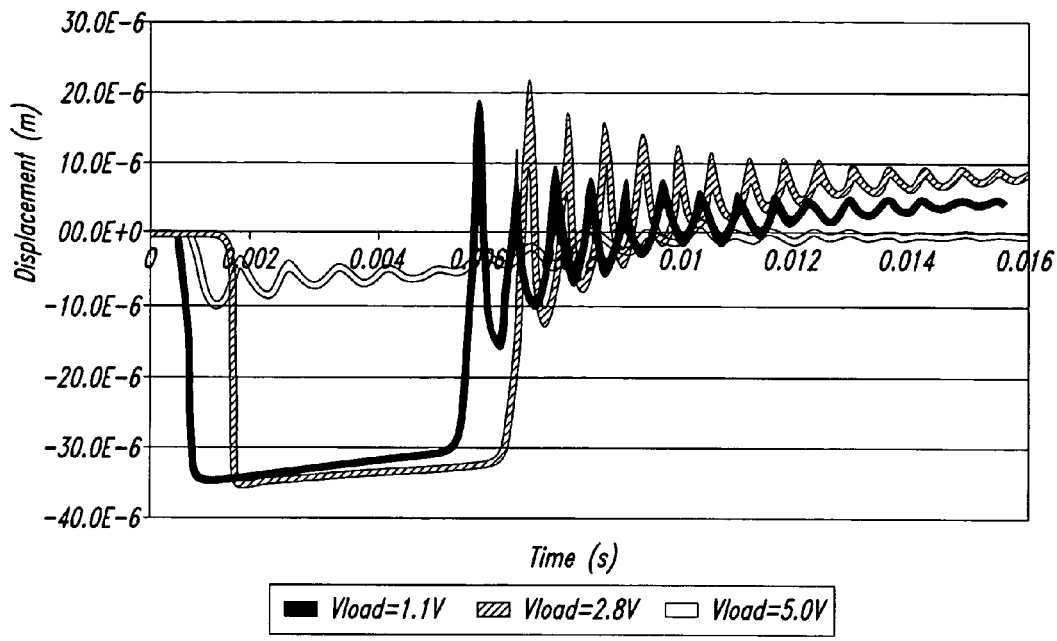
FIG. 32 is a response of one embedment of the present valve in air to a 0.5 ms pulse.
Figure 33:
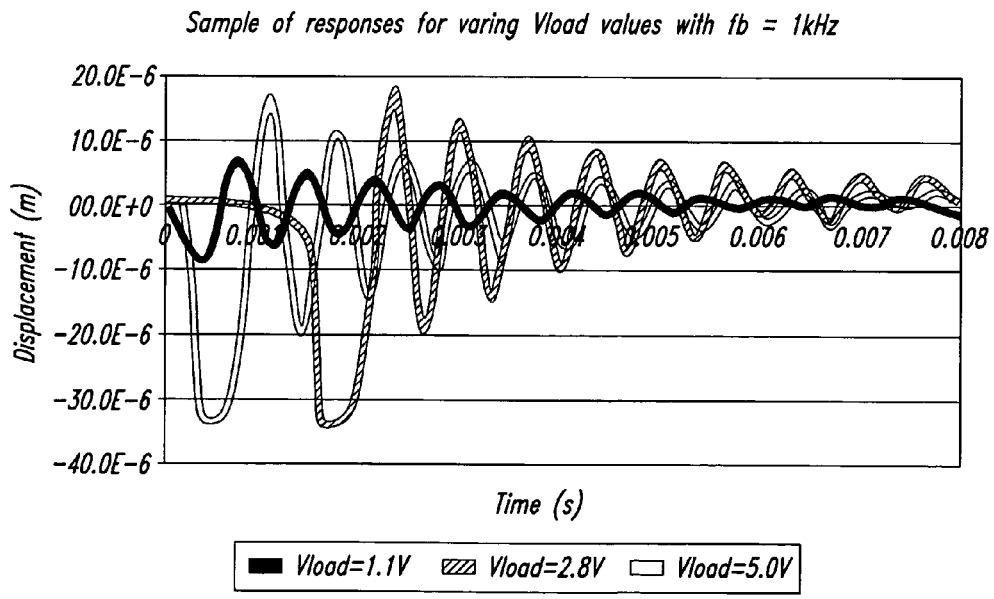
FIG. 33 is a response of one embedment of the present valve in air to a 0.05 ms pulse.

FIG. 32 displays the response modes of the three-legged valve membrane 30 obtained from the experiments with a PolyTech Laser vibrometer. As shown, the microvalve 10 undergoes an undamped oscillation. FIG. 33 shows that the valve 10 completely closed for actuation currents of 0.75 Amp and 1.0 Amp, corresponding to 2.8 and 5V. At a voltage of 1.1V across the load during a burst time of 5 ms did not generate sufficient force to close the valve 10. Rather, there appear to be two vibration modes present in this case—a forced vibration response during the voltage burst and a free response as soon as the signal ended. When the forced vibration is observed, the valve 10 seemed to deflect towards the coil. It vibrates in a partially deflected position, but it does not close fully.

Figure 34:
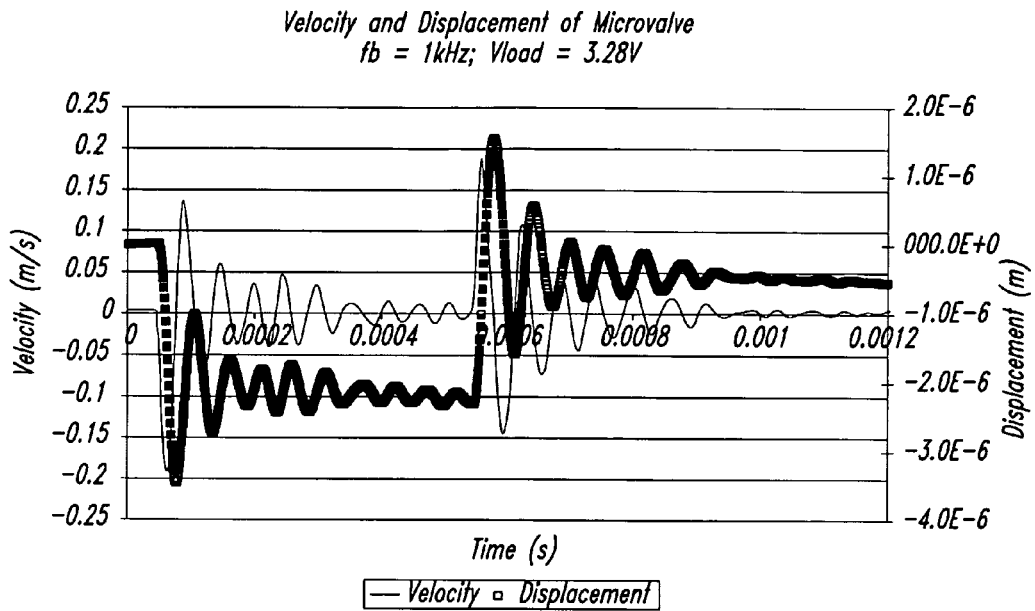
FIG. 34 is a graph of a microvalve driven with a 0.5 ms pulse.

The microvalve 10 driven with a 0.5 ms pulse also shows similar behavior and the actuation time <0.1 ms (see FIG. 34). The torsion springs integrated at the end of the support legs 34 greatly reduce its stiffness. It is reflected in the natural frequency of the membrane 30 (1.53 kHz) (see FIG. 35), which is an order of magnitude lower than the natural frequency of the microvalve 10 with four straight cantilever legs 34. The actual gap size is 34 μm, in this case which indicated the diaphragm 30 was convex prior to actuation and was confirms the microscope gap measurement of 30 μm. Once the current is removed from the coil, the membrane 30 returns to its original position and vibrates freely.

Figure 35:
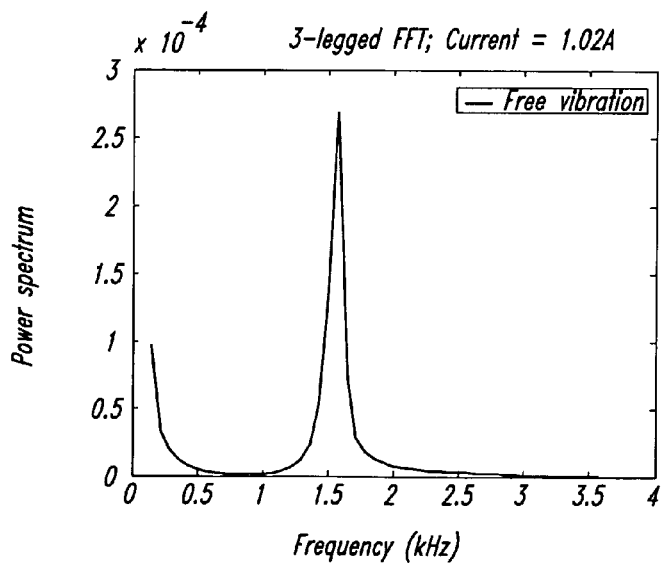
FIG. 35 shows a frequency plot for the free vibration of the valve of FIG. 31 with a resonance frequency of 1.65 KHz.

FIG. 35 shows the frequency plot for the free vibration in the FIG. 31 with a resonance frequency of 1.65 KHz. No secondary modes of vibration are present, which shows that the membrane 30 executes the linear motion only.

Figure 36:
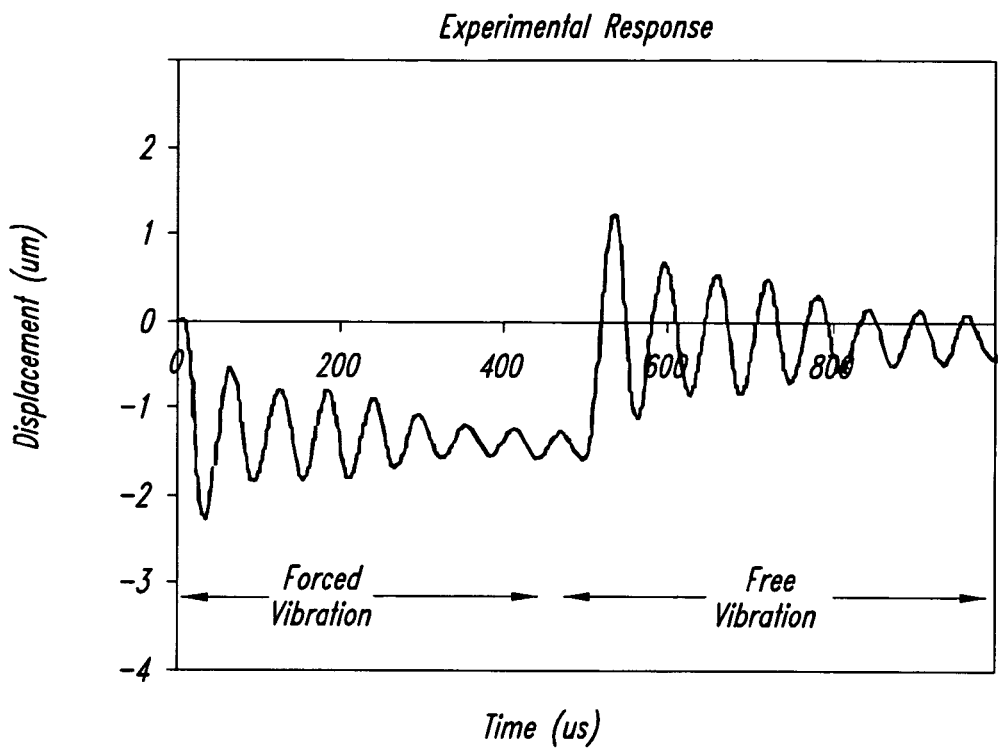
FIG. 36 shows a representative dynamic response with two distinct response regions for the movement of a four-legged valve embodiment.

There are two distinct response regions for the four-legged valve movement. The electromagnetic force is insufficient to close the valve 10 in this experiment, therefore the membrane 30 undergoes forced vibration during the voltage pulse. A representative dynamic response with two distinct response regions is illustrated in the FIG. 36. Current is delivered to the coil 42 during the forced region. In this case, the microvalve 10 is actuated with a coil 42 current of 0.78A for burst time of 500 μs. Thus, the membrane 30 undergoes forced vibration for 500 μs. When the electromagnetic force on the membrane 30 is removed, the membrane 30 returns to its original position to perform free vibration; this occurs in the free region.

Figure 37:
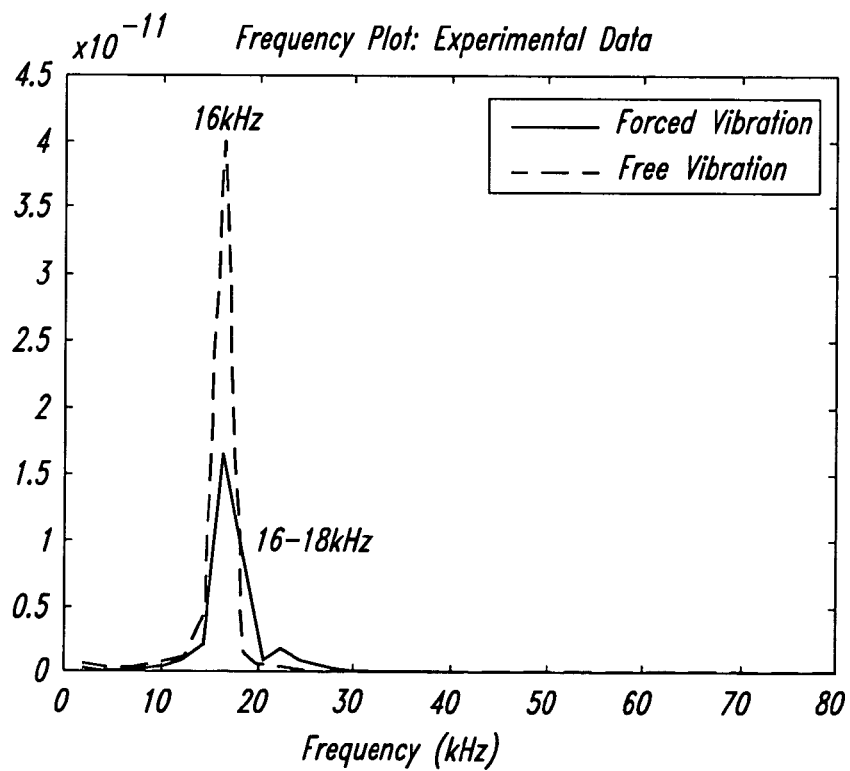
FIG. 37 is a frequency plot of frequencies of the membrane according to a preferred embodiment.

The actual frequencies of the membrane 30 in the forced and free region are 16.5 kHz and 16 kHz, respectively (see FIG. 37). Higher frequency in the forced region results from the increase in the spring stiffness due to large deflection. The membrane 30 vibration as noticed in the plots is underdamped. Air damping of the membrane 30 is minimal due to testing under open condition, which results in a high settling time of the membrane 30. However, it is estimated that the air damping will become significant under operating conditions and thus the settling time will reduce.

FIG. 39 shows alternative embodiments of the support beams that will results in different flow rate ranges of operation and closing force and transient switching times and resonant frequencies of the valve. FIG. 40 shows the three of the possible leg arrangements, however this valve is not limited to just these three as beams straight or of another shape can be placed around the perimeter of the membrane up to several hundred by lithography if necessary to achieve a different dynamic and static response.

While the invention has been disclosed in its preferred forms, it will be apparent to those skilled in the art that many modifications, additions, and deletions can be made therein without departing from the spirit and scope of the invention and its equivalents, as set forth in the following claims.

We claim:

1. An actuator locatable in a fluid flow path, the actuator comprising:
    a single substrate upon which is fabricated a membrane, a membrane activating mechanism, and an integrated circuit;
    wherein the membrane can stabilize in a first position, a second position, and an intermediate position, in the first position, the membrane inhibiting fluid flow through the fluid flow path, and in the second position, the membrane enabling fluid flow through the fluid flow path, in the intermediate position, the membrane enabling partial fluid flow through the fluid flow path; and
    the membrane activating mechanism to move the membrane between the first position, the second position, and an intermediate position.

2. The actuator of claim 1, wherein the actuator is a non-electrostatic, non-thermal actuator.

3. The actuator of claim 1, wherein the actuator is an electromagnetic actuator, and the substrate is provided with an orifice.

4. The actuator of claim 1, wherein the membrane is a pre-stressed membrane, and the membrane activating mechanism includes an electromagnetic force generator;
    wherein the membrane is positionable into the first position by the pre-stressed nature of the membrane;
    wherein when the electromagnetic force generator generates an electromagnetic force in a first direction, the membrane is drawn into the second position; and
    wherein when the electromagnetic force generator generates an electromagnetic force in a direction substantially opposite the first direction, the membrane is drawn into the first position.

5. The actuator of claim 4, wherein the membrane is stable in both the first and the second positions without an induced electromagnetic force from the electromagnetic force generator.

6. The actuator of claim 1, wherein the membrane is a convex membrane, and the membrane activating mechanism includes an electromagnetic force generator;
    wherein the membrane is positionable into the first position by the convex nature of the membrane;
    wherein when the electromagnetic force generator generates an electromagnetic force in a first direction, the membrane is drawn into the second position; and
    wherein when the electromagnetic force generator generates an electromagnetic force in a direction substantially opposite the first direction, the membrane is drawn into the first position.

7. The actuator of claim 6, wherein the membrane is stable in both the first and the second positions without an induced electromagnetic force from the electromagnetic force generator.

8. The actuator of claim 1, wherein the membrane activating mechanism includes an electromagnetic force generator and a permanent magnet, the membrane located between the electromagnetic force generator and the permanent magnet;
    wherein when the electromagnetic force generator generates a force in a direction substantially in the same direction as the force of the permanent magnet, the membrane is drawn into the first position; and
    wherein when the electromagnetic force generator generates a force in a direction substantially in an opposite direction as the force of the permanent magnet, the membrane is drawn into the second position.

9. The actuator of claim 8, wherein the membrane is stable in both the first and the second positions without an induced electromagnetic force from the electromagnetic force generator.

10. The actuator of claim 1, wherein the actuator has an energy consumption of 400 mW or less to fully actuate.

11. The actuator of claim 1, wherein the actuator fully actuates in less than or equal to 0.36 seconds.

12. An actuator for an integrated circuit, the actuator locatable in a fluid flow path, the actuator comprising:
    a single substrate upon which is fabricated a membrane and a membrane activating mechanism;

wherein the membrane can stabilize in a first position, a second position, and an intermediate position, in the first position, the membrane inhibiting fluid flow through the fluid flow path, and in the second position, the membrane enabling fluid flow through the fluid flow path, in the intermediate position, the membrane enabling partial fluid flow through the fluid flow path; and the membrane activating mechanism to move the membrane between the first position, the second position, and an intermediate position;

the membrane selected from the group consisting of a pre-stressed membrane, a convex membrane, a torsional membrane providing for rotational movement of the membrane between the first and second positions, a membrane having a dome portion, and a membrane having a dome portion and legs.

13. The actuator of claim 12, wherein the single substrate is CMOS compatible.

14. The actuator of claim 12, wherein the actuator is an electromagnetic microvalve;

wherein the single substrate has an orifice;

wherein the membrane activating mechanism includes a magnet and at least one coil;

wherein when the at least one coil generates a force in a direction substantially in the same direction as the force of the magnet, the membrane is drawn into the first position; and wherein when the at least one coil generates a force in a direction substantially in an opposite direction as the force of the magnet, the membrane is drawn into the second position.

15. The actuator of claim 14, wherein the membrane is stable in both the first and the second positions without an induced electromagnetic force from the at least one coil.

16. The actuator of claim 15, wherein the substrate has a first face and a second face; and wherein the magnet is a permanent magnet in communication with the first face of the substrate.

17. The actuator of claim 16, wherein a high permeability material with a high magnetic field saturation is provided between at least one coil turn of the at least one coil.

18. An electromagnetic actuator locatable in a fluid flow path, the actuator comprising:

a single substrate upon which is fabricated a membrane and a membrane activating mechanism, the substrate provided with an orifice;

wherein the membrane can stabilize in a first position, a second position, and an intermediate position, in the first position, the membrane inhibiting fluid flow through the fluid flow path, and in the second position, the membrane enabling fluid flow through the fluid flow path, in the intermediate position, the membrane enabling partial fluid flow through the fluid flow path; and the membrane activating mechanism to move the membrane between the first position, the second position, and an intermediate position;

wherein the membrane is a convex membrane, and the membrane activating mechanism includes an electromagnetic force generator;

wherein the membrane is positionable into the first position by the convex nature of the membrane;

wherein when the electromagnetic force generator generates an electromagnetic force in a first direction, the membrane is drawn into the second position;

wherein when the electromagnetic force generator generates an electromagnetic force in a direction substantially opposite the first direction, the membrane is drawn into the first position; and wherein the membrane is stable in both the first and the second positions without an induced electromagnetic force from the electromagnetic force generator.

* * * * *